(12) United States Patent
Zhang et al.

(10) Patent No.: US 9,673,730 B2
(45) Date of Patent: Jun. 6, 2017

(54) DOUBLE AUXILIARY RESONANT COMMUTATED POLE THREE-PHASE SOFT-SWITCHING INVERTER CIRCUIT AND MODULATION METHOD

(71) Applicants: Northeastern University, Shenyang, Liaoning Province (CN); SHENYANG UNIVERSITY OF TECHNOLOGY, Shenyang, Liaoning Province (CN)

(72) Inventors: Huaguang Zhang, Shenyang (CN); Enhui Chu, Shenyang (CN); Xing Zhang, Shenyang (CN); Bingyi Zhang, Shenyang (CN); Xiuchong Liu, Shenyang (CN); Shijie Yan, Shenyang (CN); Huiming Xiong, Shenyang (CN); Xiaochen Yang, Shenyang (CN)

(73) Assignees: Northeastern University, Shenyang, Liaoning Province (CN); Shenyang University of Technology, Shenyang, Liaoning Province (CN)

( * ) Notice: Subject to any disclaimer, the term of this patent is extended or adjusted under 35 U.S.C. 154(b) by 0 days.

(21) Appl. No.: 14/903,843

(22) PCT Filed: Dec. 12, 2014

(86) PCT No.: PCT/CN2014/093644
§ 371 (c)(1),
(2) Date: Jan. 8, 2016

(87) PCT Pub. No.: WO2016/082255
PCT Pub. Date: Jun. 2, 2016

(65) Prior Publication Data
US 2016/0329828 A1 Nov. 10, 2016

(30) Foreign Application Priority Data
Nov. 25, 2014 (CN) .................... 2014 1 06917565

(51) Int. Cl.
*H02P 27/04* (2016.01)
*H02M 7/44* (2006.01)
(Continued)

(52) U.S. Cl.
CPC ............... *H02M 7/44* (2013.01); *H02M 1/08* (2013.01); *H02M 7/538* (2013.01);
(Continued)

(58) Field of Classification Search
CPC ...................................................... H02P 27/08
(Continued)

(56) References Cited

U.S. PATENT DOCUMENTS 6,028,760 A * 2/2000 Ferreira ................. G01V 3/165
361/171
8,508,965 B2 * 8/2013 Hallak .................... H02M 1/34
363/132

FOREIGN PATENT DOCUMENTS

CN 1197554 A 10/1998
CN 1287402 A 3/2001
(Continued)

*Primary Examiner* — David S Luo
(74) *Attorney, Agent, or Firm* — Muncy, Geissler, Olds & Lowe, P.C.

(57) ABSTRACT

Provided are a double auxiliary resonant commutated pole three-phase soft-switching inverter circuit and a modulation method. The circuit includes a three-phase main inverter circuit and a three-phase double auxiliary resonant commutator circuit. An A-phase double auxiliary resonant commutator circuit, an A-phase main inverter circuit, a B-phase double auxiliary resonant commutator circuit, a B-phase main inverter circuit, a C-phase double auxiliary resonant commutator circuit and a C-phase main inverter circuit are connected in parallel in sequence and simultaneously connected with a DC power supply in parallel. The present invention can achieve the separation of the resonant current of the double auxiliary resonant commutator circuit from the (Continued)

load current at the moment of current commutation, thereby effectively reducing the current stress of the auxiliary switching tubes and the efficiency can be greatly increased particularly under light load condition.

8 Claims, 17 Drawing Sheets

(51) Int. Cl.
*H02M 1/08* (2006.01)
*H02M 7/538* (2007.01)
*H02M 7/5387* (2007.01)
*H02M 7/515* (2007.01)
*H02M 1/00* (2006.01)
*H02M 1/34* (2007.01)
*H02M 7/48* (2007.01)

(52) U.S. Cl.
CPC ........ *H02M 7/5387* (2013.01); *H02M 7/5152* (2013.01); *H02M 2001/0058* (2013.01); *H02M 2001/342* (2013.01); *H02M 2007/4815* (2013.01); *Y02B 70/1441* (2013.01); *Y02B 70/1491* (2013.01)

(58) Field of Classification Search
USPC ................ 318/801, 800, 799, 798, 767, 727
See application file for complete search history.

(56) References Cited

FOREIGN PATENT DOCUMENTS

| | | |
|---|---|---|
| CN | 1688096 A | 10/2005 |
| CN | 103199727 A | 7/2013 |
| CN | 103701356 A | 4/2014 |
| CN | 103780118 A | 5/2014 |

* cited by examiner

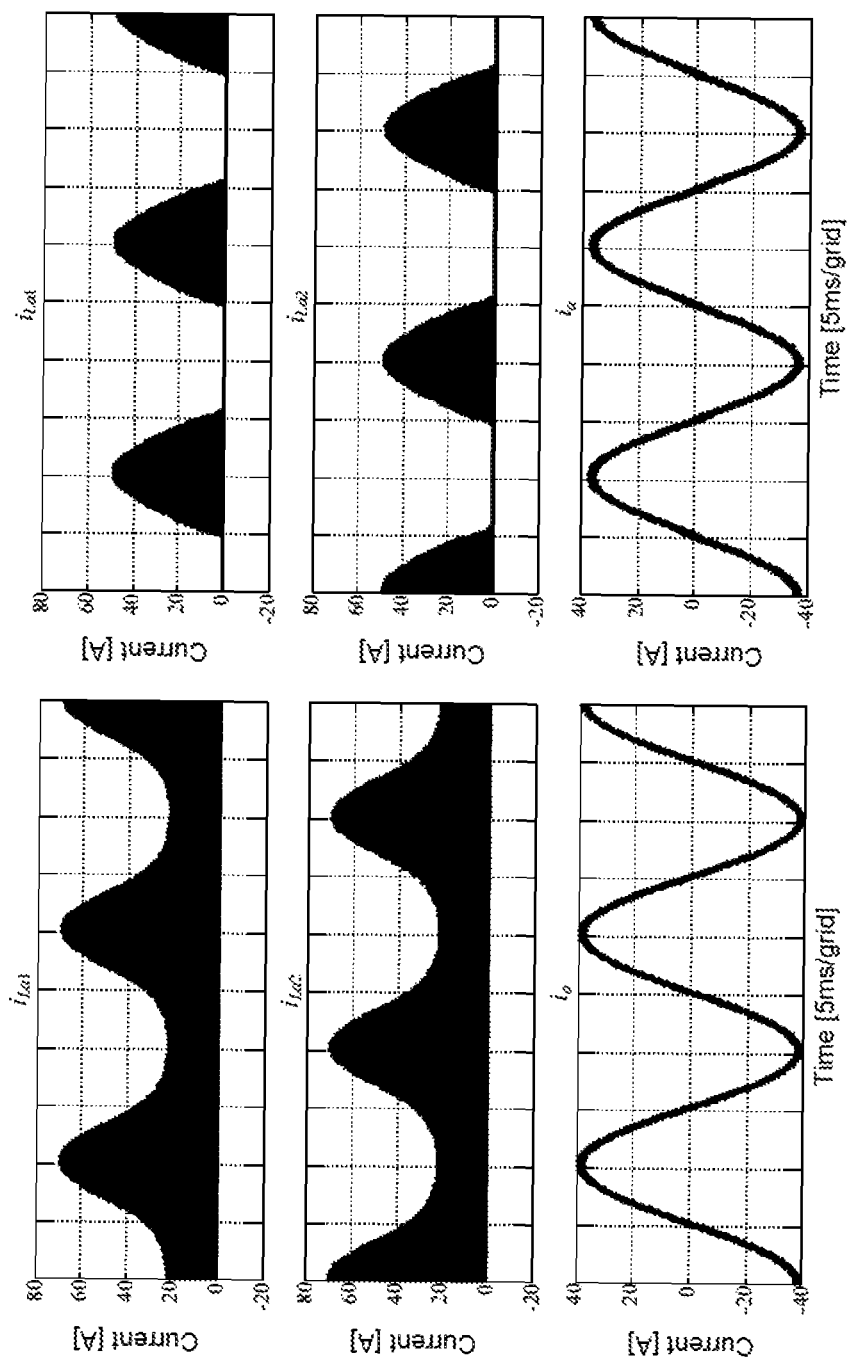

DOUBLE AUXILIARY RESONANT COMMUTATED POLE THREE-PHASE SOFT-SWITCHING INVERTER CIRCUIT AND MODULATION METHOD

BACKGROUND OF THE INVENTION

1. Field of the Invention

The present invention belongs to the technical field of power electronics, in particular relates to a double auxiliary resonant commutated pole three-phase soft-switching inverter circuit and a modulation method.

2. The Prior Arts

The power electronic technology is a technology that achieves effective utilization of electric semiconductor devices by applying circuit principles and design theory and analyzing development tools so as to efficiently transform and control electric energy. Because the modern power electronic device increasingly tends to miniaturization and light weight, high frequency of the inverter has become its important development trend. The increase of the operating frequency helps to improve performance and reduce volume for the inverter. But with the continuous increase of the switching frequency, switching loss will also be increased in proportion. In addition, noise pollution and electromagnetic interference (EMI) problems also become increasingly obvious. Aiming at the above problems, the soft-switching technology is introduced into the inverter. With the continuous development of the soft-switching inversion technology, all kinds of soft-switching inverter topological structures successively appear. In numerous soft-switching inversion topologies, an auxiliary resonant commutated pole inverter does not increase the original voltage and current stress of a main power switching device, is more suitable for high-power inversion occasions and is therefore generally concerned by researchers of relevant fields in countries of the world.

An active auxiliary resonant commutated pole inverter proposed earlier needs to use two large electrolytic capacitors, brings the problem of neutral-point potential change for the inverter and needs individual detection circuit and logic control circuit. An improved auxiliary resonant commutated pole inverter that appears subsequently, such as transformer auxiliary inverter, coupled inductor inverter, triangular or star-shaped resonance absorbing inverter, etc., either a complicated coupled inductor or transformer and a corresponding magnetic flux reset circuit are needed or mutual coupling is needed among three phases of resonant circuits, resulting in that the main circuit and the control strategy become complicated. So far, in numerous three-phase auxiliary resonant commutated pole soft-switching inverter topological loops, two main switching tubes of the same bridge arm share one set of auxiliary resonant elements and the quantity of the auxiliary elements is less, so the inverter is suitable for medium and small power occasions.

A novel auxiliary resonant pole inverter topological structure is disclosed in Chinese Journal of Scientific Instrument, Volume 30, No. 6, 2009, Chinese Journal of Electrical Engineering, Volume 33, No. 12, 2013 and IEEE Transactions on Power Electronics, Volume 29, No. 3, 2014. The circuit diagram of the inverter is shown in FIG. 1. A set of auxiliary resonant commutator circuit is arranged in each phase of three phases of circuits in the auxiliary resonant pole inverter. Each phase of auxiliary resonant commutator circuit consists of two main resonant capacitors, two auxiliary resonant capacitors, two auxiliary resonant inductors, two auxiliary switching tubes and four auxiliary diodes. The inverter avoids two large electrolytic capacitors used in a traditional resonant pole inverter and has the advantages that three phases of auxiliary resonant commutator circuits are independently controllable, load current is not required to be detected, soft switching of the switching tubes can be achieved within the range of full load, the voltage stress of each element is not greater than DC input voltage, etc. In addition, each of two main switching tubes of the same bridge arm of the inverter has a set of auxiliary resonant elements so that the power level of the inverter can be further enhanced. Therefore, the inverter is more suitable for high-power occasions. However, the auxiliary resonant pole inverter still has disadvantages: the ZVS turn-off of the auxiliary switching tubes is achieved on the premise that the parasitic inductance and the parasitic capacitance of the auxiliary resonant commutator circuits are zero, but in practical application, because of the influence of the parasitic inductance and the parasitic capacitance introduced by wiring form, the ZVS turn-off condition of the auxiliary switching tubes will be damaged and reliable ZVS turn-off cannot be achieved. Particularly, the longer the distance between the auxiliary switching tubes and the auxiliary resonant capacitors and the distance between the auxiliary switching tubes and the DC power supply are, the greater the influence of the parasitic inductance brought by loop wiring is. This influence is especially apparent along with high capacity of the device, and is also a key problem that has to be solved in future practical application.

Aiming at the above problems, Research on An Active Double Auxiliary Resonant Commutated Pole Soft-switching Inverter is disclosed in 2014 by IEEE 23rd International Symposium on Industrial Electronics (ISIE). The topological structure of the inverter is shown in FIG. 2 (for the convenience of narration, the topological structure is hereinafter called the original topology). The auxiliary resonant commutator circuit of the auxiliary resonant commutated pole inverter consists of two main resonant capacitors, two first auxiliary resonant capacitors, two second auxiliary resonant capacitors, two first auxiliary resonant inductors, two second auxiliary resonant inductors, two auxiliary switching tubes and eight auxiliary diodes. The topological loop of the inverter can effectively avoid the influence caused by the parasitic inductance and the parasitic capacitance of the loop brought by the wiring form of the loop on ZVS turn-off of the auxiliary switching tubes, thereby ensuring that the auxiliary switching tubes reliably achieve ZVS turn-off.

However, the original topology still has disadvantages: in order to achieve the soft switching of the switching tubes, the auxiliary resonant commutator circuits shall flow through resonant current, so the current that actually flows through the auxiliary resonant commutator circuits is the sum of the resonant current and the load current at the moment of current commutation. Therefore, within the range of full load, even in no load condition, the auxiliary resonant commutator circuits shall flow through high resonant current. The resulting conduction loss has become an important reason for limiting the increase in efficiency of the auxiliary pole inverter, and is also a key problem that has to be solved in future practical application.

SUMMARY OF THE INVENTION

Aiming at the defects of the prior art, the present invention provides a double auxiliary resonant commutated pole three-phase soft-switching inverter circuit and a modulation method. The double auxiliary resonant commutated pole three-phase soft-switching inverter circuit of the present invention not only can realize soft switching of all switching tubes, but also can avoid superimposing resonant current of an auxiliary resonant commutator circuit during current commutation and load current at the moment of current commutation, and can effectively reduce the current stress of auxiliary switching tubes of an inverter and the circulating current loss of the auxiliary resonant commutator circuit, thereby achieving that a soft-switching inverter maintains efficient transformation of electrical energy within the range of full load.

The present invention has the following technical schemes:

A double auxiliary resonant commutated pole three-phase soft-switching inverter circuit includes a three-phase main inverter circuit and a three-phase double auxiliary resonant commutator circuit.

The three-phase main inverter circuit adopts a three-phase bridge type circuit structure that includes an A-phase main inverter circuit, a B-phase main inverter circuit and a C-phase main inverter circuit. The three-phase double auxiliary resonant commutator circuit includes an A-phase double auxiliary resonant commutator circuit, a B-phase double auxiliary resonant commutator circuit and a C-phase double auxiliary resonant commutator circuit.

The A-phase double auxiliary resonant commutator circuit, the A-phase main inverter circuit, the B-phase double auxiliary resonant commutator circuit, the B-phase main inverter circuit, the C-phase double auxiliary resonant commutator circuit and the C-phase main inverter circuit are connected in parallel in sequence and simultaneously connected with a DC power supply in parallel.

The main inverter circuit of each phase includes a first main switching tube, a second main switching tube, a first main diode and a second main diode. An emitter of the first main switching tube is connected with a collector of the second main switching tube, the first main switching tube and the first main diode are connected in inverse parallel, and the second main switching tube and the second main diode are connected in inverse parallel.

The double auxiliary resonant commutator circuit of each phase includes a first auxiliary switching tube, a second auxiliary switching tube, a third auxiliary switching tube, a fourth auxiliary switching tube, a first main resonant capacitor, a second main resonant capacitor, a first auxiliary resonant capacitor, a second auxiliary resonant capacitor, a third auxiliary resonant capacitor, a fourth auxiliary resonant capacitor, a first auxiliary resonant inductor, a second auxiliary resonant inductor, a third auxiliary resonant inductor, a fourth auxiliary resonant inductor, a first auxiliary diode, a second auxiliary diode, a third auxiliary diode, a fourth auxiliary diode, a fifth auxiliary diode, a sixth auxiliary diode, a seventh auxiliary diode, an eighth auxiliary diode, a ninth auxiliary diode and a tenth auxiliary diode.

A negative electrode of the first main resonant capacitor is connected with a positive electrode of the second main resonant capacitor; a positive electrode of the first main resonant capacitor is connected with a collector of the first auxiliary switching tube; a negative electrode of the second main resonant capacitor is connected with an emitter of the second auxiliary switching tube; an emitter of the first auxiliary switching tube is connected with one end of the first auxiliary resonant inductor; the other end of the first auxiliary resonant inductor is connected to a connection point between the first main resonant capacitor and the second main resonant capacitor; a collector of the second auxiliary switching tube is connected with one end of the second auxiliary resonant inductor; and the other end of the second auxiliary resonant inductor is connected to a connection point between the first main resonant capacitor and the second main resonant capacitor.

A positive electrode of the first auxiliary resonant capacitor is connected with a collector of the first auxiliary switching tube; the positive electrode of the first auxiliary resonant capacitor is also connected to a positive electrode of a DC bus; a negative electrode of the first auxiliary resonant capacitor is connected with a collector of the third auxiliary switching tube; an emitter of the third auxiliary switching tube is connected with a cathode of the fifth auxiliary diode; an anode of the fifth auxiliary diode is connected with one end of the third auxiliary resonant inductor; the other end of the third auxiliary resonant inductor is connected with a negative electrode of the third auxiliary resonant capacitor; a positive electrode of the third auxiliary resonant capacitor is connected with a negative electrode of the fourth auxiliary resonant capacitor; the negative electrode of the fourth auxiliary resonant capacitor is also connected to a connection point between the first auxiliary resonant inductor and the second auxiliary resonant inductor; a positive electrode of the fourth auxiliary resonant capacitor is connected with one end of the fourth auxiliary resonant inductor; the other end of the fourth auxiliary resonant inductor is connected with a cathode of the sixth auxiliary diode; an anode of the sixth auxiliary diode is connected with a collector of the fourth auxiliary switching tube; an emitter of the fourth auxiliary switching tube is connected with a positive electrode of the second auxiliary resonant capacitor; a negative electrode of the second auxiliary resonant capacitor is connected with an emitter of the second auxiliary switching tube; and the negative electrode of the second auxiliary resonant capacitor is also connected to a negative electrode of the DC bus.

An anode of the first auxiliary diode is connected to a connection point between a cathode of the fifth auxiliary diode and an emitter of the third auxiliary switching tube, and a cathode of the first auxiliary diode is connected to a connection point between the emitter of the first auxiliary switching tube and the first auxiliary resonant inductor. A cathode of the second auxiliary diode is connected to a connection point between the anode of the sixth auxiliary anode and the collector of the fourth auxiliary switching tube, and an anode of the second auxiliary diode is connected to a connection point between the collector of the second auxiliary switching tube and the second auxiliary resonant inductor.

An anode of the third auxiliary diode is connected to a connection point between the cathode of the fifth auxiliary diode and the emitter of the third auxiliary switching tube, and a cathode of the third auxiliary diode is connected to a connection point between the negative electrode of the first auxiliary resonant capacitor and the collector of the third auxiliary switching tube. An anode of the fourth auxiliary diode is connected to a connection point between the positive electrode of the second auxiliary resonant capacitor and the emitter of the fourth auxiliary switching tube, and a cathode of the fourth auxiliary diode is connected to a connection point between the anode of the sixth auxiliary diode and the collector of the fourth auxiliary switching tube.

An anode of the seventh auxiliary diode is connected to a connection point between the fourth auxiliary resonant capacitor and the fourth auxiliary resonant inductor, and a cathode of the seventh auxiliary diode is connected to the positive electrode of the DC bus. A cathode of the eighth auxiliary diode is connected to a connection point between the third auxiliary resonant capacitor and the third auxiliary resonant inductor, and an anode of the eighth auxiliary diode is connected to the negative electrode of the DC bus.

An anode of the ninth auxiliary diode is connected to a connection point between the cathode of the sixth auxiliary diode and the fourth auxiliary resonant inductor, and a cathode of the ninth auxiliary diode is connected to the positive electrode of the DC bus. A cathode of the tenth auxiliary diode is connected to a connection point between the anode of the fifth auxiliary diode and the third auxiliary resonant inductor, and an anode of the tenth auxiliary diode is connected to the negative electrode of the DC bus.

The connection point between the third auxiliary resonant capacitor and the fourth auxiliary resonant capacitor, the connection point between the first auxiliary resonant inductor and the second auxiliary resonant inductor, the connection point between the first main resonant capacitor and the second main resonant capacitor, and the connection point between the first main switching tube and the second main switching tube are connected in sequence; and an outgoing line at the connection point between the first main switching tube and the second main switching tube is a single-phase AC output end.

A collector of the first main switching tube of the three-phase main inverter circuit is connected with the collector of the first auxiliary switching tube, and an emitter of the second main switching tube is connected with the emitter of the second auxiliary switching tube.

Full-control switching devices are adopted by the first main switching tube and the second main switching tube of the three-phase main inverter circuit, and the first auxiliary switching tube, the second auxiliary switching tube, the third auxiliary switching tube and fourth auxiliary switching tube of the three-phase double auxiliary resonant commutator circuit.

The full-control switching devices are power transistors, insulated gate bipolar transistors, power field effect transistors or intelligent power modules.

Fast recovery diodes or high-frequency diodes are adopted by the first main diode and the second main diode in the three-phase main inverter circuit and the first auxiliary diode, the second auxiliary diode, the third auxiliary diode, the fourth auxiliary diode, the fifth auxiliary diode, the sixth auxiliary diode, the seventh auxiliary diode, the eighth auxiliary diode, the ninth auxiliary diode and the tenth auxiliary diode in the three-phase double auxiliary resonant commutator circuit.

The operating mode of the main inverter circuit of each phase and the double auxiliary resonant commutator circuit of each phase in the double auxiliary resonant commutated pole three-phase soft-switching inverter circuit includes:

Mode a: The first main switching tube and the third auxiliary switching tube are conducted; the current flows to the load through the first main switching tube; and the circuit is in power supply state;

Mode b: The first main switching tube and the third auxiliary switching tube are simultaneously turned off; the load current is commutated to the first main resonant capacitor, the second main resonant capacitor and the third auxiliary resonant capacitor; under the action of the first main resonant capacitor, the second main resonant capacitor and the third auxiliary resonant capacitor, the first main switching tube achieves zero-voltage turn-off; and meanwhile, the third auxiliary switching tube achieves zero-voltage zero-current turn-off;

Mode c: When the voltage of the second main resonant capacitor and the third auxiliary resonant capacitor is decreased to zero and the voltage of the first main resonant capacitor is increased to an input DC power voltage value, the load current is commutated to the second main diode; and when the second main switching tube is turned on during the conduction of the second main diode, the second main switching tube achieves zero-voltage zero-current turn-on;

Mode d: The first auxiliary switching tube is turned on; the current on the first auxiliary resonant inductor rises from zero; the load current is commutated from the second main diode to the first auxiliary resonant inductor; and the first auxiliary switching tube is turned on at zero current;

Mode e: After the current of the second main diode is reduced to zero, the first main resonant capacitor, the second main resonant capacitor and the first auxiliary resonant inductor begin resonance; and the current that flows through the first auxiliary resonant inductor is the sum of the resonant current and the load current at the moment of current commutation;

Mode f: When the voltage of the first main resonant capacitor is decreased to the initial voltage value of the first auxiliary resonant capacitor, the first auxiliary resonant capacitor, the third auxiliary resonant capacitor, the third auxiliary resonant inductor and the first auxiliary resonant inductor begin resonance; the first main resonant capacitor, the second main resonant capacitor and the first auxiliary resonant inductor continue to carry out resonance; when the voltage of the first main resonant capacitor is decreased to zero, the first main resonant capacitor, the second main resonant capacitor and the first auxiliary resonant inductor finish resonance; and when the third auxiliary switching tube is turned on within an interval from this mode to the turn-off of the first auxiliary switching tube, the third auxiliary switching tube achieves zero-voltage turn-on;

Mode g: When the current of the first auxiliary resonant inductor reaches a maximum value, the first main diode is conducted; the first auxiliary resonant capacitor, the third auxiliary resonant inductor and the third auxiliary resonant capacitor continue to carry out resonance; the energy in the first auxiliary resonant capacitor continues to transfer to the third auxiliary resonant capacitor; the current in the first auxiliary resonant inductor keeps unchanged; when the current of the third auxiliary resonant inductor is decreased to zero, the first auxiliary resonant capacitor, the third auxiliary resonant inductor and the third auxiliary resonant capacitor finish resonance; and when the first main switching tube is turned on during the conduction of the first main diode, the first main switching tube achieves zero-voltage turn-on;

Mode h: When the current of the third auxiliary resonant inductor is decreased to zero, the third auxiliary diode and the fifth auxiliary diode are turned off; and the resonant current is circulated in a loop formed by the first auxiliary switching tube, the first auxiliary resonant inductor and the first main diode;

Mode i: After the first auxiliary switching tube is turned off, the first auxiliary resonant inductor and the first auxiliary resonant capacitor begin resonance; the energy in the first auxiliary resonant inductor transfers to the first auxiliary resonant capacitor; and the first auxiliary switching tube achieves zero-voltage turn-off;

Mode j: When the voltage of the first auxiliary resonant capacitor is increased to the input DC power voltage value, the energy of the first auxiliary resonant inductor is fed back to the input DC power supply through the first auxiliary diode, the fifth auxiliary diode and the tenth auxiliary diode;

Mode k: When the current of the first auxiliary resonant inductor is decreased to a load current value, the first main diode is turned off; the load current is commutated from the first auxiliary resonant inductor to the first main switching tube; and the energy in the first auxiliary resonant inductor is directly released to the load; and Mode l: When the current of the first auxiliary resonant inductor is decreased to zero, the first auxiliary resonant capacitor, the third auxiliary resonant capacitor and the third auxiliary resonant inductor begin resonance; the energy in the first auxiliary resonant capacitor transfers to the third auxiliary resonant capacitor; and when the current of the third auxiliary resonant inductor is decreased to zero, the energy transfer is ended and the circuit returns to Mode a again.

The modulation method of the double auxiliary resonant commutated pole three-phase soft-switching inverter circuit is:

simultaneously turning off the first main switching tube and the third auxiliary switching tube; making the turn-on moment of the second auxiliary switching tube later than the turn-off moment of the first main switching tube by $\delta_{t11}$ time; making the turn-on moment of the fourth auxiliary switching tube later than the turn-on moment of the second auxiliary switching tube by $\delta_{t12}$ time; making the turn-on moment of the second main switching tube later than the turn-on moment of the fourth auxiliary switching tube by $\delta_{t13}$ time; and making the turn-off moment of the second auxiliary switching tube later than the turn-on moment of the second main switching tube by $\delta_{t2}$ time;

simultaneously turning off the second main switching tube and the fourth auxiliary switching tube; making the turn-on moment of the first auxiliary switching tube later than the turn-off moment of the second main switching tube by $\delta_{t11}$ time; making the turn-on moment of the third auxiliary switching tube later than the turn-on moment of the first auxiliary switching tube by $\delta_{t12}$ time; making the turn-on moment of the first main switching tube later than the turn-on moment of the third auxiliary switching tube by $\delta_{t13}$ time; and making the turn-off moment of the first auxiliary switching tube later than the turn-on moment of the first main switching tube by $\delta_{t2}$ time; and operating each main switching tube in accordance with the mode of sinusoidal pulse width modulation and complementary conduction having a phase difference of 180°.

The delay time $\delta_{t11}$, $\delta_{t12}$, $\delta_{t13}$ and $\delta_{t2}$ satisfy these conditions:

$$\delta_{t11} \geq \frac{E(2C_a + C_c)}{I_a};$$

$$\delta_{t12} \geq \frac{L_a}{E} i_{amax} + \frac{\pi}{2} \cdot \sqrt{2L_a C_a};$$

$$\delta_{t11} + \delta_{t12} + \delta_{t13} \leq t_{dead};$$

$$\delta_{t2} \geq \frac{E(2C_a + C_c)}{I_a} + \frac{L_a}{E} i_{amax} +$$

$$\frac{\pi}{2} \cdot \sqrt{2L_a C_a} + \pi \cdot \sqrt{\frac{L_b C_b C_c}{C_b + C_c}} - \delta_{t11} - \delta_{t12} - \delta_{t13},$$

where E is the input DC power voltage value; $C_a$ is the capacitance value of the first main resonant capacitor or the second main resonant capacitor; $C_b$ is the capacitance value of the first auxiliary resonant capacitor or the second auxiliary resonant capacitor; $C_c$ is the capacitance value of the third auxiliary resonant capacitor or the fourth auxiliary resonant capacitor; $L_a$ is the inductance value of the first auxiliary resonant inductor or the second auxiliary resonant inductor; $L_b$ is the inductance value of the third auxiliary resonant inductor or the fourth auxiliary resonant inductor; $t_{dead}$ is the switching dead time of the switching tubes of an upper and a lower bridge arms of a hard-switching inverter; $I_a$ is a set separated current value; and $i_{amax}$ is an output maximum load current value.

The present invention has the following beneficial effects:

The switching devices in the three-phase main inverter circuit and the three-phase double auxiliary resonant commutator circuit in the double auxiliary resonant commutated pole three-phase soft-switching inverter circuit of the present invention are full-control devices which include power transistors (GTR), insulated gate bipolar transistors (IGBT), power field effect transistors (MOSFET) or intelligent power modules (IPM). In this way, a switching circuit can be directly controlled by a control circuit.

All the switching tubes of the double auxiliary resonant commutated pole three-phase soft-switching inverter circuit of the present invention achieve soft switching, thereby reducing switching loss.

The double auxiliary resonant commutated pole three-phase soft-switching inverter circuit of the present invention can achieve the separation of the resonant current of the double auxiliary resonant commutator circuit from the load current at the moment of current commutation, thereby effectively reducing the current stress of the auxiliary switching tubes.

By effectively avoiding superimposing the load current at the moment of current commutation and the resonant current, the double auxiliary resonant commutated pole three-phase soft-switching inverter circuit of the present invention can effectively reduce the circulating current loss of the double auxiliary resonant commutator circuit, and particularly can greatly increase the efficiency under light load condition.

BRIEF DESCRIPTION OF THE DRAWINGS

FIGS. 6a-6l show commutation operating mode diagrams of a double auxiliary resonant commutated pole three-phase soft-switching inverter circuit of an embodiment of the present invention; wherein FIG. 6a is a schematic diagram of a commutation operating mode a; FIG. 6b is a schematic diagram of a commutation operating mode b; FIG. 6c is a schematic diagram of a commutation operating mode c; FIG. 6d is a schematic diagram of a commutation operating mode d; FIG. 6e is a schematic diagram of a commutation operating mode e; FIG. 6f is a schematic diagram of a commutation operating mode f; FIG. 6g is a schematic diagram of a commutation operating mode g; FIG. 6h is a schematic diagram of a commutation operating mode h; FIG. 6i is a schematic diagram of a commutation operating mode i; FIG. 6j is a schematic diagram of a commutation operating mode j; FIG. 6k is a schematic diagram of a commutation operating mode k; and FIG. 6l is a schematic diagram of a commutation operating mode l;

FIGS. 11a and 11b show simulation waveform diagrams of a double auxiliary resonant commutated pole three-phase soft-switching inverter and current of a first auxiliary resonant inductor $L_{a1}$ of A phase and a second auxiliary resonant inductor $L_{a2}$ of A phase of a double auxiliary resonant commutated pole three-phase soft-switching inverter circuit of an embodiment of the present invention; wherein FIG. 11a is a simulation waveform diagram of current of an auxiliary resonant inductor of a double auxiliary resonant commutated pole three-phase soft-switching inverter; FIG. 11b is a simulation waveform diagram of current of a first auxiliary resonant inductor $L_{a1}$ of A phase and current of a second auxiliary resonant inductor $L_{a2}$ of A phase of a double auxiliary resonant commutated pole three-phase soft-switching inverter circuit of an embodiment of the present invention;

FIGS. 12a and 12b show simulation waveform diagrams of a double auxiliary resonant commutated pole three-phase soft-switching inverter and voltage of a first auxiliary resonant capacitor $C_{a1}$ of A phase and voltage of a second auxiliary resonant capacitor $C_{a2}$ of A phase of a double auxiliary resonant commutated pole three-phase soft-switching inverter circuit of an embodiment of the present invention; wherein FIG. 12a is a simulation waveform diagram of voltage of an auxiliary resonant capacitor of a double auxiliary resonant commutated pole three-phase soft-switching inverter; FIG. 12b is a simulation waveform diagram of voltage of a first auxiliary resonant capacitor $C_{a1}$ of A phase and a second auxiliary resonant capacitor $C_{a2}$ of A phase of a double auxiliary resonant commutated pole three-phase soft-switching inverter circuit of an embodiment of the present invention.

DETAILED DESCRIPTION OF THE PREFERRED EMBODIMENT

The embodiment of the present invention is described below in detail in conjunction with the accompanying drawings.

A double auxiliary resonant commutated pole three-phase soft-switching inverter circuit includes a three-phase main inverter circuit and a three-phase double auxiliary resonant commutator circuit.

Figure 1:
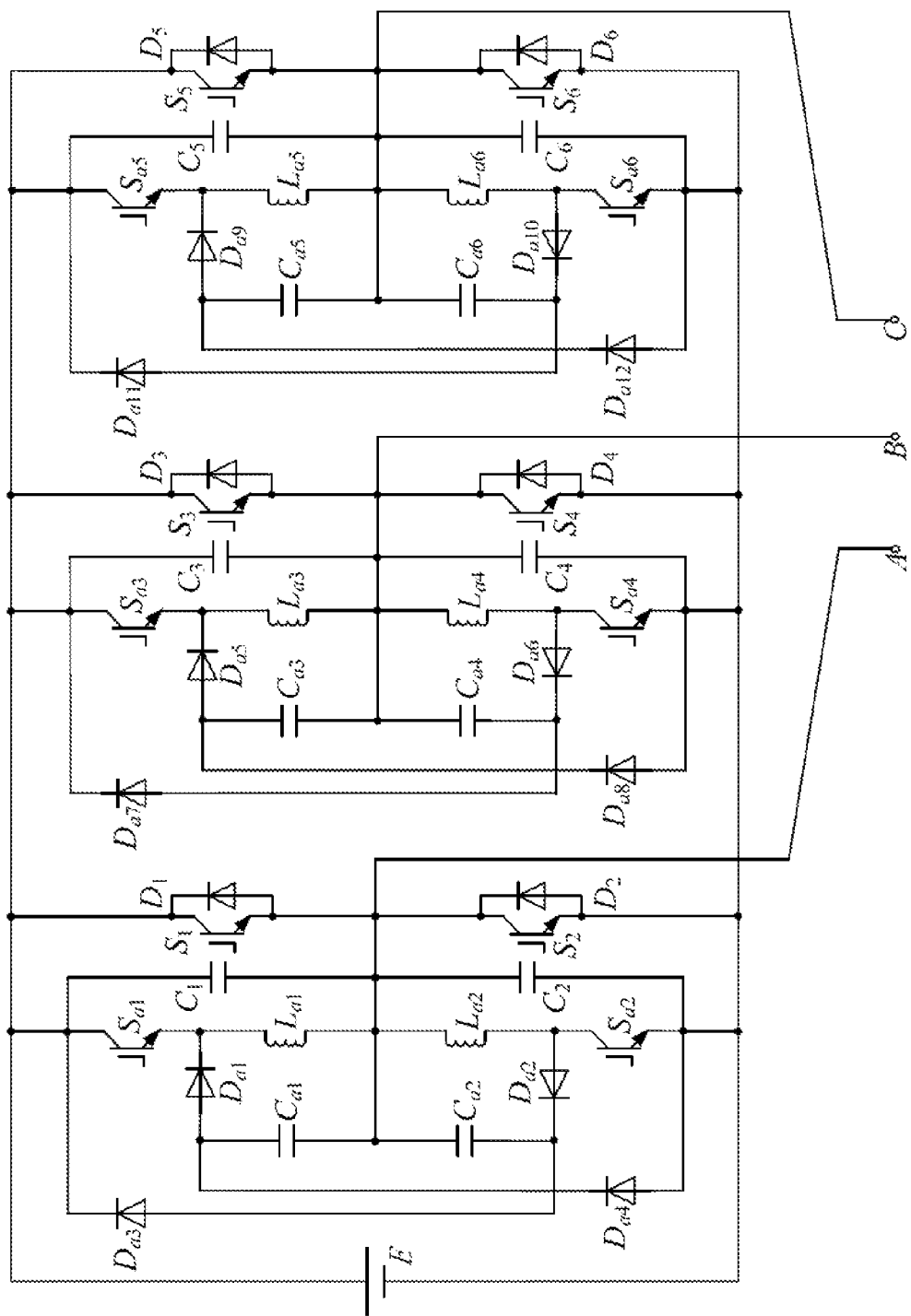
FIG. 1 is a circuit diagram of an auxiliary resonant commutated pole three-phase soft-switching inverter.
Figure 2:
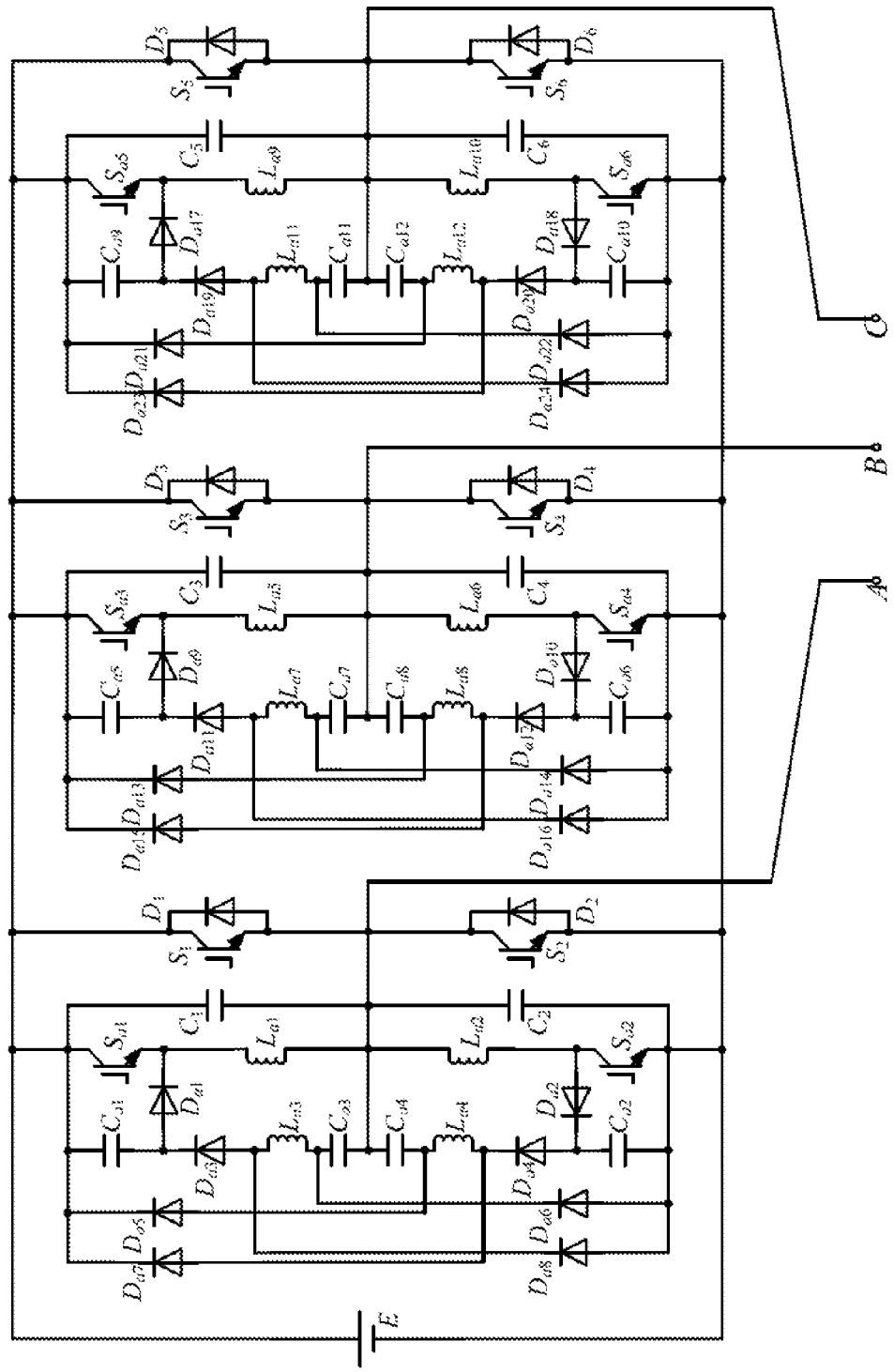
FIG. 2 is a circuit diagram of a double auxiliary resonant commutated pole three-phase soft-switching inverter.
Figure 3:
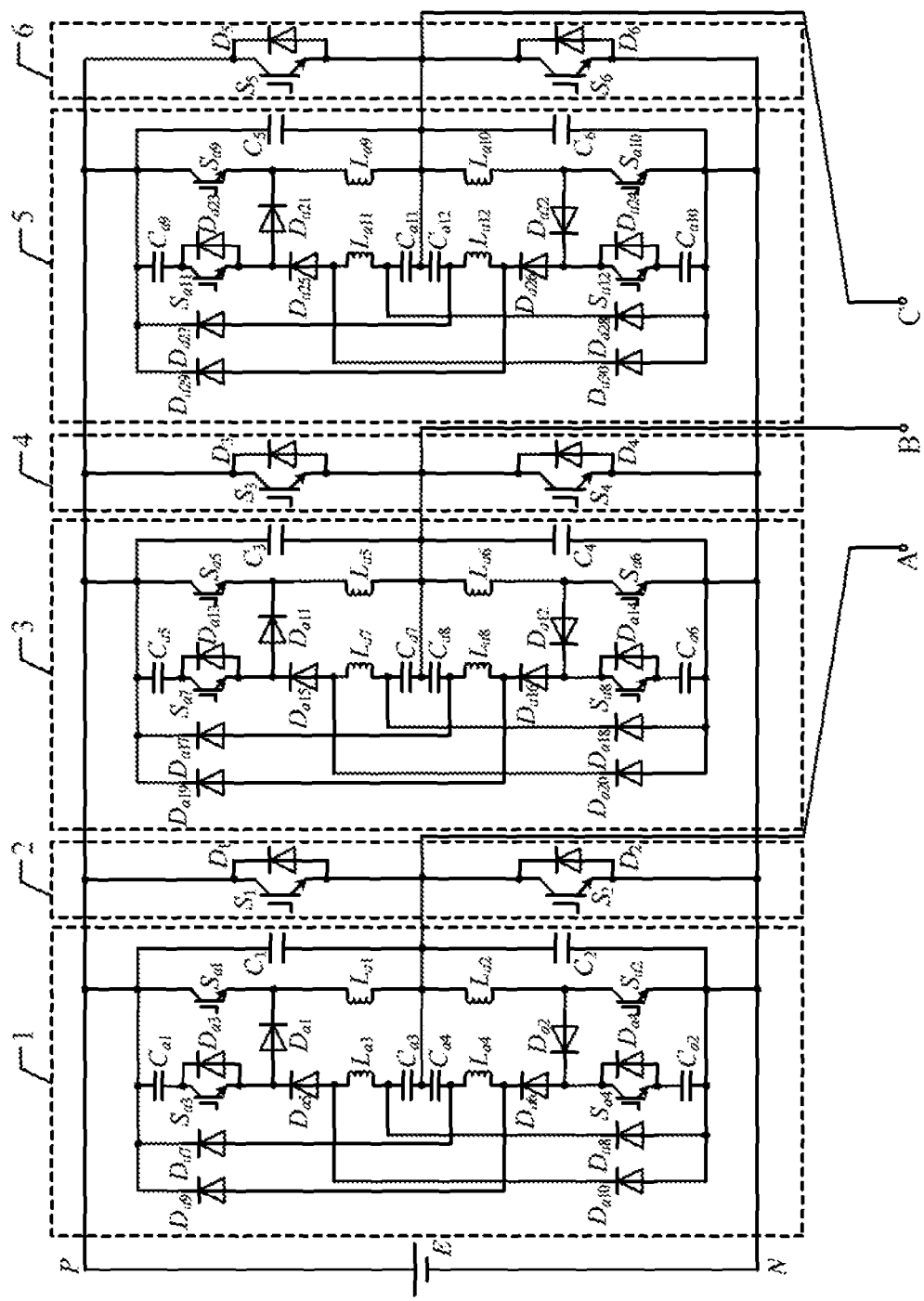
FIG. 3 is a three-phase equivalent circuit diagram of a double auxiliary resonant commutated pole three-phase soft-switching inverter circuit of an embodiment of the present invention; wherein 1-A-phase double auxiliary resonant commutator circuit; 2-A-phase main inverter circuit; 3-B-phase double auxiliary resonant commutator circuit; 4-B-phase main inverter circuit; 5-C-phase double auxiliary resonant commutator circuit; and 6-C-phase main inverter circuit.

The three-phase main inverter circuit adopts a three-phase bridge type circuit structure that includes an A-phase main inverter circuit 2, a B-phase main inverter circuit 4 and a C-phase main inverter circuit 6 as shown in FIG. 3. The three-phase double auxiliary resonant commutator circuit includes an A-phase double auxiliary resonant commutator circuit 1, a B-phase double auxiliary resonant commutator circuit 3 and a C-phase double auxiliary resonant commutator circuit 5.

The A-phase double auxiliary resonant commutator circuit 1, the A-phase main inverter circuit 2, the B-phase double auxiliary resonant commutator circuit 3, the B-phase main inverter circuit 4, the C-phase double auxiliary resonant commutator circuit 5 and the C-phase main inverter circuit 6 are connected in parallel in sequence and simultaneously connected with a DC power supply in parallel.

The main inverter circuit of each phase includes a first main switching tube, a second main switching tube, a first main diode and a second main diode.

The double auxiliary resonant commutator circuit of each phase includes a first auxiliary switching tube, a second auxiliary switching tube, a third auxiliary switching tube, a fourth auxiliary switching tube, a first main resonant capacitor, a second main resonant capacitor, a first auxiliary resonant capacitor, a second auxiliary resonant capacitor, a third auxiliary resonant capacitor, a fourth auxiliary resonant capacitor, a first auxiliary resonant inductor, a second auxiliary resonant inductor, a third auxiliary resonant inductor, a fourth auxiliary resonant inductor, a first auxiliary diode, a second auxiliary diode, a third auxiliary diode, a fourth auxiliary diode, a fifth auxiliary diode, a sixth auxiliary diode, a seventh auxiliary diode, an eighth auxiliary diode, a ninth auxiliary diode and a tenth auxiliary diode.

Figure 4:
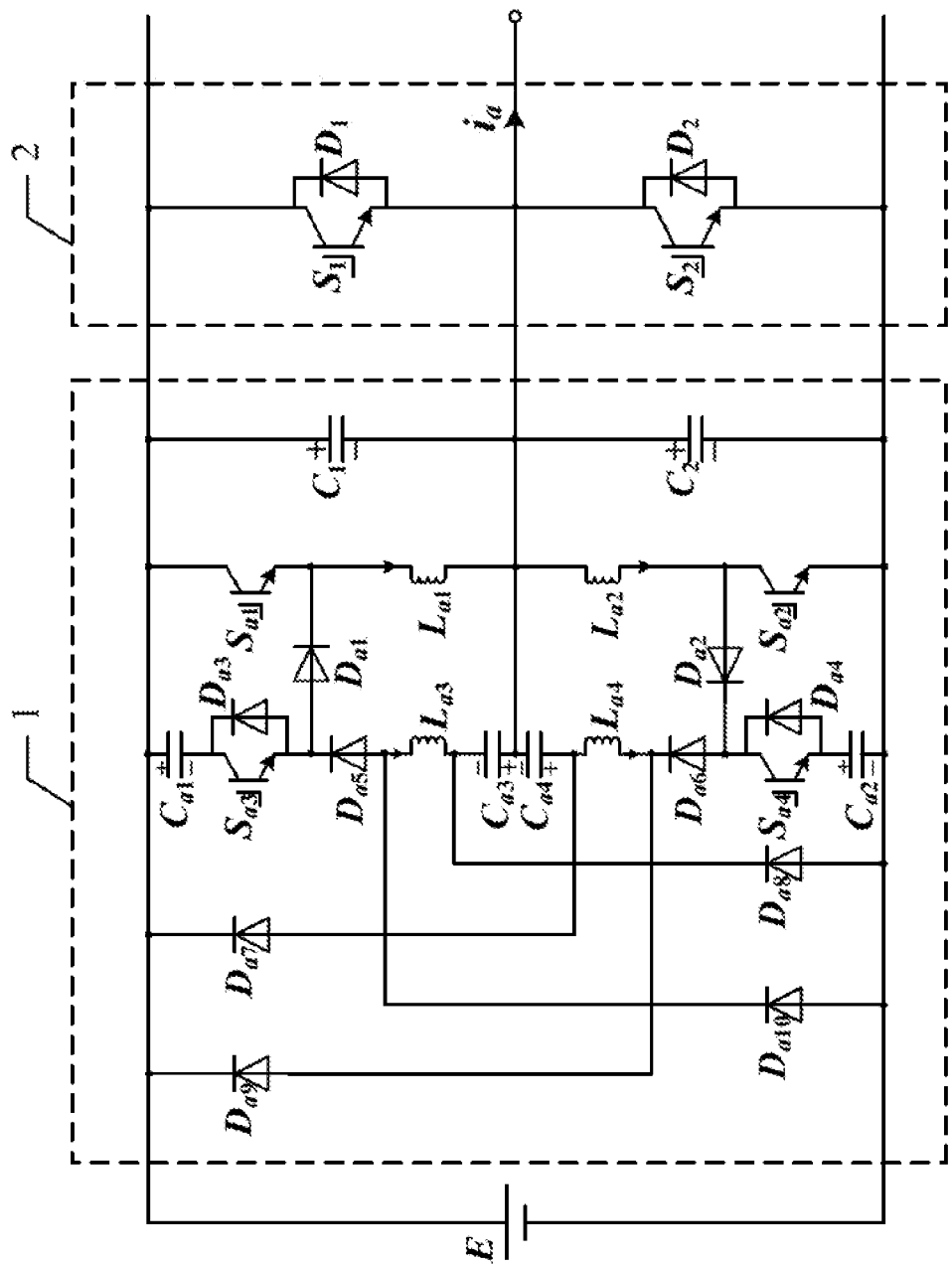
FIG. 4 is an A-phase main inverter circuit and a double auxiliary resonant commutator circuit thereof in a double auxiliary resonant commutated pole three-phase soft-switching inverter circuit of an embodiment of the present invention.

The A-phase main inverter circuit and the double auxiliary resonant commutator circuit thereof are shown in FIG. 4.

On A phase, the first main switching tube $S_1$ and the second main switching tube $S_2$ are positioned in an A-phase bridge arm; and an emitter of the first main switching tube $S_1$ is connected with a collector of the second main switching tube $S_2$, the first main switching tube $S_1$ and the first main diode $D_1$ are connected in inverse parallel, and the second main switching tube $S_2$ and the second main diode $D_2$ are connected in inverse parallel. The first main resonant capacitor $C_1$ and the first main switching tube $S_1$ are connected in parallel. The second main resonant capacitor $C_2$ and the second main switching tube $S_2$ are connected in parallel. A negative electrode of the first main resonant capacitor $C_1$ is connected with a positive electrode of the second main resonant capacitor $C_2$; a positive electrode of the first main resonant capacitor $C_1$ is connected with a collector of the first auxiliary switching tube $S_{a1}$; a negative electrode of the second main resonant capacitor $C_2$ is connected with an emitter of the second auxiliary switching tube $S_{a2}$; an emitter of the first auxiliary switching tube $S_{a1}$ is connected with one end of the first auxiliary resonant inductor $L_{a1}$; the other end of the first auxiliary resonant inductor $L_{a1}$ is connected to a connection point between the first main resonant capacitor $C_1$ and the second main resonant capacitor $C_2$; a collector of the second auxiliary switching tube $S_{a2}$ is connected with one end of the second auxiliary resonant inductor $L_{a2}$; and the other end of the second auxiliary resonant inductor $L_{a2}$ is connected to a connection point between the first main resonant capacitor $C_1$ and the second main resonant capacitor $C_2$.

A positive electrode of the first auxiliary resonant capacitor $C_{a1}$ is connected with a collector of the first auxiliary switching tube $S_{a1}$; the positive electrode of the first auxiliary resonant capacitor $C_{a1}$ is also connected to a P electrode of a DC bus; a negative electrode of the first auxiliary resonant capacitor $C_{a1}$ is connected with a collector of the third auxiliary switching tube $S_{a3}$; an emitter of the third auxiliary switching tube $S_{a3}$ is connected with a cathode of the fifth auxiliary diode $D_{a5}$; an anode of the fifth auxiliary diode $D_{a5}$ is connected with one end of the third auxiliary resonant inductor $L_{a3}$; the other end of the third auxiliary resonant inductor $L_{a3}$ is connected with a negative electrode of the third auxiliary resonant capacitor $C_{a3}$; a positive electrode of the third auxiliary resonant capacitor $C_{a3}$ is connected with a negative electrode of the fourth auxiliary resonant capacitor $C_{a4}$; the negative electrode of the fourth auxiliary resonant capacitor $C_{a4}$ is also connected to a connection point between the first auxiliary resonant inductor $L_{a1}$ and the second auxiliary resonant inductor $L_{a2}$; a positive electrode of the fourth auxiliary resonant capacitor $C_{a4}$ is connected with one end of the fourth auxiliary resonant inductor $L_{a4}$; the other end of the fourth auxiliary resonant inductor $L_{a4}$ is connected with a cathode of the sixth auxiliary diode $D_{a6}$; an anode of the sixth auxiliary diode $D_{a6}$ is connected with a collector of the fourth auxiliary switching tube $S_{a4}$; an emitter of the fourth auxiliary switching tube $S_{a4}$ is connected with a positive electrode of the second auxiliary resonant capacitor $C_{a2}$; a negative electrode of the second auxiliary resonant capacitor $C_{a2}$ is connected with an emitter of the second auxiliary switching tube $S_{a2}$; and the negative electrode of the second auxiliary resonant capacitor $C_{a2}$ is also connected to an N electrode of the DC bus.

An anode of the first auxiliary diode $D_{a1}$ is connected to a connection point between a cathode of the fifth auxiliary diode $D_{a5}$ and an emitter of the third auxiliary switching tube $S_{a3}$, and a cathode of the first auxiliary diode $D_{a1}$ is connected to a connection point between the emitter of the first auxiliary switching tube $S_{a1}$ and the first auxiliary resonant inductor $L_{a1}$. A cathode of the second auxiliary diode $D_{a2}$ is connected to a connection point between the anode of the sixth auxiliary anode $D_{a6}$ and the collector of the fourth auxiliary switching tube $S_{a4}$, and an anode of the second auxiliary diode $D_{a2}$ is connected to a connection point between the collector of the second auxiliary switching tube $S_{a2}$ and the second auxiliary resonant inductor $L_{a2}$.

An anode of the third auxiliary diode $D_{a3}$ is connected to a connection point between the cathode of the fifth auxiliary diode $D_{a5}$ and the emitter of the third auxiliary switching tube $S_{a3}$, and a cathode of the third auxiliary diode $D_{a3}$ is connected to a connection point between the negative electrode of the first auxiliary resonant capacitor $C_{a1}$ and the collector of the third auxiliary switching tube $S_{a3}$. An anode of the fourth auxiliary diode $D_{a4}$ is connected to a connection point between the positive electrode of the second auxiliary resonant capacitor $C_{a2}$ and the emitter of the fourth auxiliary switching tube $S_{a4}$, and a cathode of the fourth auxiliary diode $D_{a4}$ is connected to a connection point between the anode of the sixth auxiliary diode $D_{a6}$ and the collector of the fourth auxiliary switching tube $S_{a4}$.

An anode of the seventh auxiliary diode $D_{a7}$ is connected to a connection point between the fourth auxiliary resonant capacitor $C_{a4}$ and the fourth auxiliary resonant inductor $L_{a4}$, and a cathode of the seventh auxiliary diode $D_{a7}$ is connected to the P electrode of the DC bus. A cathode of the eighth auxiliary diode $D_{a8}$ is connected to a connection point between the third auxiliary resonant capacitor $C_{a3}$ and the third auxiliary resonant inductor $L_{a3}$, and an anode of the eighth auxiliary diode $D_{a8}$ is connected to the N electrode of the DC bus.

An anode of the ninth auxiliary diode $D_{a9}$ is connected to a connection point between the cathode of the sixth auxiliary diode $D_{a6}$ and the fourth auxiliary resonant inductor $L_{a4}$, and a cathode of the ninth auxiliary diode $D_{a9}$ is connected to the P electrode of the DC bus. A cathode of the tenth auxiliary diode $D_{a10}$ is connected to a connection point between the anode of the fifth auxiliary diode $D_{a5}$ and the third auxiliary resonant inductor $L_{a3}$, and an anode of the tenth auxiliary diode $D_{a10}$ is connected to the N electrode of the DC bus.

The connection point between the third auxiliary resonant capacitor $C_{a3}$ and the fourth auxiliary resonant capacitor $C_{a4}$, the connection point between the first auxiliary resonant inductor $L_{a1}$ and the second auxiliary resonant inductor $L_{a2}$, the connection point between the first main resonant capacitor $C_1$ and the second main resonant capacitor $C_2$, and the connection point between the first main switching tube $S_1$ and the second main switching tube $S_2$ are connected in sequence; and an outgoing line at the connection point between the first main switching tube $S_1$ and the second main switching tube $S_2$ is an A-phase AC output end.

On B phase, the first main switching tube $S_3$ and the second main switching tube $S_4$ are positioned in a B-phase bridge arm; and an emitter of the first main switching tube $S_3$ is connected with a collector of the second main switching tube $S_4$, the first main switching tube $S_3$ and the first main diode $D_3$ are connected in inverse parallel, and the second main switching tube $S_4$ and the second main diode $D_4$ are connected in inverse parallel. The first main resonant capacitor $C_3$ and the first main switching tube $S_3$ are connected in parallel. The second main resonant capacitor $C_4$ and the second main switching tube $S_4$ are connected in parallel. A negative electrode of the first main resonant capacitor $C_3$ is connected with a positive electrode of the second main resonant capacitor $C_4$; a positive electrode of the first main resonant capacitor $C_3$ is connected with a collector of the first auxiliary switching tube $S_{a5}$; a negative electrode of the second main resonant capacitor $C_4$ is connected with an emitter of the second auxiliary switching tube $S_{a6}$; an emitter of the first auxiliary switching tube $S_{a5}$ is connected with one end of the first auxiliary resonant inductor $L_{a5}$; the other end of the first auxiliary resonant inductor $L_{a5}$ is connected to a connection point between the first main resonant capacitor $C_3$ and the second main resonant capacitor $C_4$; a collector of the second auxiliary switching tube $S_{a6}$ is connected with one end of the second auxiliary resonant inductor $L_{a6}$; and the other end of the second auxiliary resonant inductor $L_{a6}$ is connected to a connection point between the first main resonant capacitor $C_3$ and the second main resonant capacitor $C_4$.

A positive electrode of the first auxiliary resonant capacitor $C_{a5}$ is connected with a collector of the first auxiliary switching tube $S_{a5}$; the positive electrode of the first auxiliary resonant capacitor $C_{a5}$ is also connected to the P electrode of the DC bus; a negative electrode of the first auxiliary resonant capacitor $C_{a5}$ is connected with a collector of the third auxiliary switching tube $S_{a7}$; an emitter of the third auxiliary switching tube $S_{a7}$ is connected with a cathode of the fifth auxiliary diode $D_{a15}$; an anode of the fifth auxiliary diode $D_{a15}$ is connected with one end of the third auxiliary resonant inductor $L_{a7}$; the other end of the third auxiliary resonant inductor $L_{a7}$ is connected with a negative electrode of the third auxiliary resonant capacitor $C_{a7}$; a positive electrode of the third auxiliary resonant capacitor $C_{a7}$ is connected with a negative electrode of the fourth auxiliary resonant capacitor $C_{a8}$; the negative electrode of the fourth auxiliary resonant capacitor $C_{a8}$ is also connected to a connection point between the first auxiliary resonant inductor $L_{a5}$ and the second auxiliary resonant inductor $L_{a6}$; a positive electrode of the fourth auxiliary resonant capacitor $C_{a8}$ is connected with one end of the fourth auxiliary resonant inductor $L_{a8}$; the other end of the fourth auxiliary resonant inductor $L_{a8}$ is connected with a cathode of the sixth auxiliary diode $D_{a16}$; an anode of the sixth auxiliary diode $D_{a16}$ is connected with a collector of the fourth auxiliary switching tube $S_{a8}$; an emitter of the fourth auxiliary switching tube $S_{a8}$ is connected with a positive electrode of the second auxiliary resonant capacitor $C_{a6}$; a negative electrode of the second auxiliary resonant capacitor $C_{a6}$ is connected with an emitter of the second auxiliary switching tube $S_{a6}$; and the negative electrode of the second auxiliary resonant capacitor $C_{a6}$ is also connected to an N electrode of the DC bus.

An anode of the first auxiliary diode $D_{a11}$ is connected to a connection point between a cathode of the fifth auxiliary diode $D_{a15}$ and an emitter of the third auxiliary switching tube $S_{a7}$, and a cathode of the first auxiliary diode $D_{a11}$ is connected to a connection point between the emitter of the first auxiliary switching tube $S_{a5}$ and the first auxiliary resonant inductor $L_{a5}$. A cathode of the second auxiliary diode $D_{a12}$ is connected to a connection point between the anode of the sixth auxiliary anode $D_{a16}$ and the collector of the fourth auxiliary switching tube $S_{a8}$, and an anode of the second auxiliary diode $D_{a12}$ is connected to a connection point between the collector of the second auxiliary switching tube $S_{a6}$ and the second auxiliary resonant inductor $L_{a6}$.

An anode of the third auxiliary diode $D_{a13}$ is connected to a connection point between the cathode of the fifth auxiliary diode $D_{a15}$ and the emitter of the third auxiliary switching tube $S_{a7}$, and a cathode of the third auxiliary diode $D_{a13}$ is connected to a connection point between the negative electrode of the first auxiliary resonant capacitor $C_{a5}$ and the collector of the third auxiliary resonant switching tube $S_{a7}$. An anode of the fourth auxiliary diode $D_{a14}$ is connected to a connection point between the positive electrode of the second auxiliary resonant capacitor $C_{a6}$ and the emitter of the fourth auxiliary switching tube $S_{a8}$, and a cathode of the fourth auxiliary diode $D_{a14}$ is connected to a connection point between the anode of the sixth auxiliary diode $D_{a16}$ and the collector of the fourth auxiliary switching tube $S_{a8}$.

An anode of the seventh auxiliary diode $D_{a17}$ is connected to a connection point between the fourth auxiliary resonant capacitor $C_{a8}$ and the fourth auxiliary resonant inductor $L_{a8}$, and a cathode of the seventh auxiliary diode $D_{a17}$ is connected to the P electrode of the DC bus. A cathode of the eighth auxiliary diode $D_{a18}$ is connected to a connection point between the third auxiliary resonant capacitor $C_{a7}$ and the third auxiliary resonant inductor $L_{a7}$, and an anode of the eighth auxiliary diode $D_{a18}$ is connected to the N electrode of the DC bus.

An anode of the ninth auxiliary diode $D_{a19}$ is connected to a connection point between the cathode of the sixth auxiliary diode $D_{a16}$ and the fourth auxiliary inductor $L_{a6}$, and a cathode of the ninth auxiliary diode $D_{a19}$ is connected to the P electrode of the DC bus. A cathode of the tenth auxiliary diode $D_{a20}$ is connected to a connection point between the anode of the fifth auxiliary diode $D_{a15}$ and the third auxiliary resonant inductor $L_{a7}$, and an anode of the tenth auxiliary diode $D_{a20}$ is connected to the N electrode of the DC bus.

The connection point between the third auxiliary resonant capacitor $C_{a7}$ and the fourth auxiliary resonant capacitor $C_{a8}$, the connection point between the first auxiliary resonant inductor $L_{a5}$ and the second auxiliary resonant inductor $L_{a6}$, the connection point between the first main resonant capacitor $C_3$ and the second main resonant capacitor $C_4$, and the connection point between the first main switching tube $S_3$ and the second main switching tube $S_4$ are connected in sequence; and an outgoing line at the connection point between the first main switching tube $S_3$ and the second main switching tube $S_4$ is a B-phase AC output end.

On C phase, the first main switching tube $S_5$ and the second main switching tube $S_6$ are positioned in a C-phase bridge arm; and an emitter of the first main switching tube $S_5$ is connected with a collector of the second main switching tube $S_6$, the first main switching tube $S_5$ and the first main diode $D_5$ are connected in inverse parallel, and the second main switching tube $S_6$ and the second main diode $D_6$ are connected in inverse parallel. The first main resonant capacitor $C_5$ and the first main switching tube $S_5$ are connected in parallel. The second main resonant capacitor $C_6$ and the second main switching tube $S_6$ are connected in parallel. A negative electrode of the first main resonant capacitor $C_5$ is connected with a positive electrode of the second main resonant capacitor $C_6$; a positive electrode of the first main resonant capacitor $C_5$ is connected with a collector of the first auxiliary switching tube $S_{a9}$; a negative electrode of the second main resonant capacitor $C_6$ is connected with an emitter of the second auxiliary switching tube $S_{a10}$; an emitter of the first auxiliary switching tube $S_{a9}$ is connected with one end of the first auxiliary resonant inductor $L_{a9}$; the other end of the first auxiliary resonant inductor $L_{a9}$ is connected to a connection point between the first main resonant capacitor $C_5$ and the second main resonant capacitor $C_6$; a collector of the second auxiliary switching tube $S_{a10}$ is connected with one end of the second auxiliary resonant inductor $L_{a10}$; and the other end of the second auxiliary resonant inductor $L_{a10}$ is connected to a connection point between the first main resonant capacitor $C_5$ and the second main resonant capacitor $C_6$.

A positive electrode of the first auxiliary resonant capacitor $C_{a9}$ is connected with a collector of the first auxiliary switching tube $S_{a9}$; the positive electrode of the first auxiliary resonant capacitor $C_{a9}$ is also connected to the P electrode of the DC bus; a negative electrode of the first auxiliary resonant capacitor $C_{a9}$ is connected with a collector of the third auxiliary switching tube $S_{a11}$; an emitter of the third auxiliary switching tube $S_{a11}$ is connected with a cathode of the fifth auxiliary diode $D_{a25}$; an anode of the fifth auxiliary diode $D_{a25}$ is connected with one end of the third auxiliary resonant inductor $L_{a11}$; the other end of the third auxiliary resonant inductor $L_{a11}$ is connected with a negative electrode of the third auxiliary resonant capacitor $C_{a11}$; a positive electrode of the third auxiliary resonant capacitor $C_{a11}$ is connected with a negative electrode of the fourth auxiliary resonant capacitor $C_{a12}$; the negative electrode of the fourth auxiliary resonant capacitor $C_{a12}$ is also connected to a connection point between the first auxiliary resonant inductor $L_{a9}$ and the second auxiliary resonant inductor $L_{a10}$; a positive electrode of the fourth auxiliary resonant capacitor $C_{a12}$ is connected with one end of the fourth auxiliary resonant inductor $L_{a12}$; the other end of the fourth auxiliary resonant inductor $L_{a12}$ is connected with a cathode of the sixth auxiliary diode $D_{a26}$; an anode of the sixth auxiliary diode $D_{a26}$ is connected with a collector of the fourth auxiliary switching tube $S_{a12}$; an emitter of the fourth auxiliary switching tube $S_{a12}$ is connected with a positive electrode of the second auxiliary resonant capacitor $C_{a10}$; a negative electrode of the second auxiliary resonant capacitor $C_{a10}$ is connected with an emitter of the second auxiliary switching tube $S_{a10}$; and the negative electrode of the second auxiliary resonant capacitor $C_{a10}$ is also connected to the N electrode of the DC bus.

An anode of the first auxiliary diode $D_{a21}$ is connected to a connection point between a cathode of the fifth auxiliary diode $D_{a25}$ and an emitter of the third auxiliary switching tube $S_{a11}$ and a cathode of the first auxiliary diode $D_{a21}$ is connected to a connection point between the emitter of the first auxiliary switching tube $S_{a9}$ and the first auxiliary resonant inductor $L_{a9}$. A cathode of the second auxiliary diode $D_{a22}$ is connected to a connection point between the anode of the sixth auxiliary anode $D_{a26}$ and the collector of the fourth auxiliary switching tube $S_{a12}$, and an anode of the second auxiliary diode $D_{a22}$ is connected to a connection point between the collector of the second auxiliary switching tube $S_{a10}$ and the second auxiliary resonant inductor $L_{a10}$.

An anode of the third auxiliary diode $D_{a23}$ is connected to a connection point between the cathode of the fifth auxiliary diode $D_{a25}$ and the emitter of the third auxiliary switching tube $S_{a11}$, and a cathode of the third auxiliary diode $D_{a23}$ is connected to a connection point between the negative electrode of the first auxiliary resonant capacitor $C_{a9}$ and the collector of the third auxiliary switching tube $S_{a11}$. An anode of the fourth auxiliary diode $D_{a24}$ is connected to a connection point between the positive electrode of the second auxiliary resonant capacitor $C_{a10}$ and the emitter of the fourth auxiliary switching tube $S_{a12}$, and a cathode of the fourth auxiliary diode $D_{a24}$ is connected to a connection point between the anode of the sixth auxiliary diode $D_{a26}$ and the collector of the fourth auxiliary switching tube $S_{a12}$.

An anode of the seventh auxiliary diode $D_{a27}$ is connected to a connection point between the fourth auxiliary resonant capacitor $C_{a12}$ and the fourth auxiliary resonant inductor $L_{a12}$, and a cathode of the seventh auxiliary diode $D_{a27}$ is connected to the P electrode of the DC bus. A cathode of the eighth auxiliary diode $D_{a28}$ is connected to a connection point between the third auxiliary resonant capacitor $C_{a11}$ and the third auxiliary resonant inductor $L_{a11}$, and an anode of the eighth auxiliary diode $D_{a28}$ is connected to the N electrode of the DC bus.

An anode of the ninth auxiliary diode $D_{a29}$ is connected to a connection point between the cathode of the sixth auxiliary diode $D_{a26}$ and the fourth auxiliary resonant inductor $L_{a12}$, and a cathode of the ninth auxiliary diode $D_{a29}$ is connected to the P electrode of the DC bus. A cathode of the tenth auxiliary diode $D_{a30}$ is connected to a connection point between the anode of the fifth auxiliary diode $D_{a25}$ and the third auxiliary resonant inductor $L_{a11}$, and an anode of the tenth auxiliary diode $D_{a30}$ is connected to the N electrode of the DC bus.

The connection point between the third auxiliary resonant capacitor $C_{a11}$ and the fourth auxiliary resonant capacitor $C_{a12}$, the connection point between the first auxiliary resonant inductor $L_{a9}$ and the second auxiliary resonant inductor $L_{a10}$, the connection point between the first main resonant capacitor $C_5$ and the second main resonant capacitor $C_6$, and the connection point between the first main switching tube $S_5$ and the second main switching tube $S_6$ are connected in sequence; and an outgoing line at the connection point between the first main switching tube $S_5$ and the second main switching tube $S_6$ is a C-phase AC output end.

A collector of the first main switching tube of the three-phase main inverter circuit is connected with the collector of the first auxiliary switching tube, and an emitter of the second main switching tube is connected with the emitter of the second auxiliary switching tube.

Full-control switching devices are adopted by the first main switching tube and the second main switching tube of the three-phase main inverter circuit, and the first auxiliary switching tube, the second auxiliary switching tube, the third auxiliary switching tube and fourth auxiliary switching tube of the three-phase double auxiliary resonant commutator circuit.

The full-control switching devices are power transistors, insulated gate bipolar transistors, power field effect transistors or intelligent power modules.

Fast recovery diodes or high-frequency diodes are adopted by the first main diode and the second main diode in the three-phase main inverter circuit and the first auxiliary diode, the second auxiliary diode, the third auxiliary diode, the fourth auxiliary diode, the fifth auxiliary diode, the sixth auxiliary diode, the seventh auxiliary diode, the eighth auxiliary diode, the ninth auxiliary diode and the tenth auxiliary diode in the three-phase double auxiliary resonant commutator circuit.

The double auxiliary resonant commutated pole three-phase soft-switching inverter circuit of the embodiment is suitable for all kinds of power levels of inversion occasions, presents more outstanding advantages particularly in high-power inversion occasions and can perform an important role in the fields of industrial production, traffic and transportation, communication system, power system, new energy system, various power supply systems, aerospace, etc. By taking the application of the double auxiliary resonant commutated pole three-phase soft-switching inverter circuit in the variable-frequency speed adjusting system as an example below, the operating process of the double auxiliary resonant commutated pole three-phase soft-switching inverter circuit of the embodiment is analyzed.

Firstly, relatively stable direct current is obtained after three-phase alternating current in a power grid is delivered into a rectifier and rectified. Then, the direct current is inputted into the double auxiliary resonant commutated pole three-phase soft-switching inverter circuit of the embodiment for performing transformation of electrical energy. The specific transformation process of electrical energy is as follows:

The phase difference among A phase, B phase and C phase of the double auxiliary resonant commutated pole three-phase soft-switching inverter circuit of the embodiment is 120°; the phase difference between the first main switching tube and the second main switching tube of the bridge arm of the main inverter circuit of each phase is 180° electrical angle for complementary conduction; a trigger signal of the main switching tube is an SPWM signal with a phase difference of 180° electrical angle having a dead zone; at the same time of entering the dead zone by the main switching tube, a corresponding auxiliary switching tube is triggered and turned on; after the dead zone time of the main switching tube is ended, the auxiliary switching tube is turned off. When the main switching tube is turned on, the operating process of the soft-switching inverter is the same as the operating process of a traditional hard-switching three-phase bridge type inverter. When the main switching tube enters the dead zone, the auxiliary switching tube is turned on. At this moment, the double auxiliary resonant commutator circuit is operated. In one switching cycle of each phase of circuit of the double auxiliary resonant commutated pole three-phase soft-switching inverter circuit, the main inverter circuit and the double auxiliary resonant commutator circuit are respectively operated alternately once.

Figure 5:
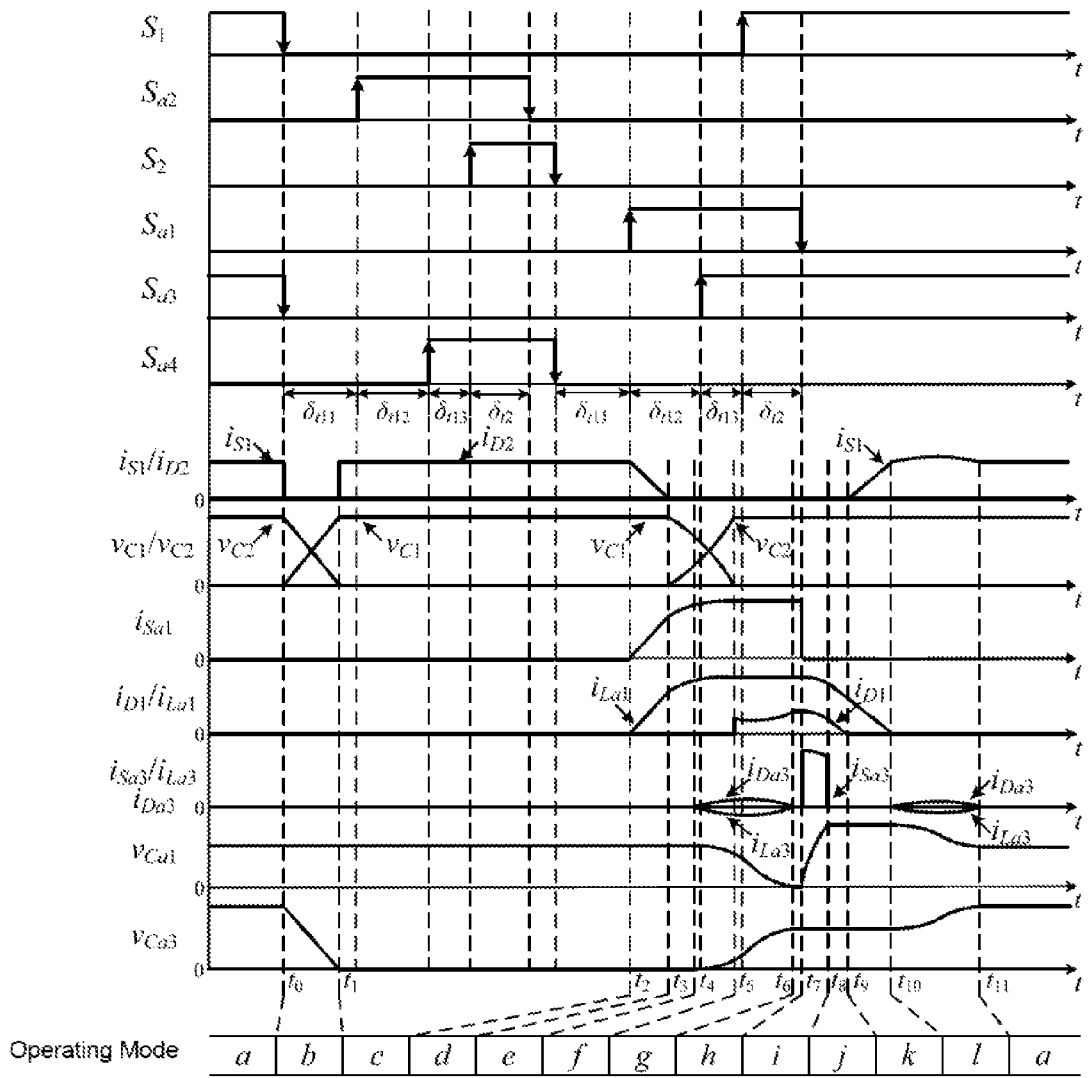
FIG. 5 is an A-phase time sequence waveform diagram of a double auxiliary resonant commutated pole three-phase soft-switching inverter circuit of an embodiment of the present invention.

The A-phase time sequence waveform diagram of the double auxiliary resonant commutated pole three-phase soft-switching inverter circuit of the embodiment of the present invention is shown in FIG. 5. By taking A phase as an example, the modulation method of the double auxiliary resonant commutated pole three-phase soft-switching inverter circuit is:

simultaneously turning off the first main switching tube $S_1$ and the third auxiliary switching tube $S_{a3}$; making the turn-on moment of the second auxiliary switching tube $S_{a2}$ later than the turn-off moment of the first main switching tube $S_1$ by $\delta_{t11}$ time; making the turn-on moment of the fourth auxiliary switching tube $S_{a4}$ later than the turn-on moment of the second auxiliary switching tube $S_{a2}$ by $\delta_{t12}$ time; making the turn-on moment of the second main switching tube $S_2$ later than the turn-on moment of the fourth auxiliary switching tube $S_{a4}$ by $\delta_{t13}$ time; and making the turn-off moment of the second auxiliary switching tube $S_{a2}$ later than the turn-on moment of the second main switching tube $S_2$ by $\delta_{t2}$ time; and simultaneously turning off the second main switching tube $S_2$ and the fourth auxiliary switching tube $S_{a4}$; making the turn-on moment of the first auxiliary switching tube $S_{a1}$ later than the turn-off moment of the second main switching tube $S_2$ by $\delta_{t11}$ time; making the turn-on moment of the third auxiliary switching tube $S_{a3}$ later than the turn-on moment of the first auxiliary switching tube $S_{a1}$ by $\delta_{t12}$ time; making the turn-on moment of the first main switching tube $S_1$ later than the turn-on moment of the third auxiliary switching tube $S_{a3}$ by $\delta_{t13}$ time; and making the turn-off moment of the first auxiliary switching tube $S_{a1}$ later than the turn-on moment of the first main switching tube $S_1$ by $\delta_{t2}$ time; and operating each main switching tube in accordance with the mode of sinusoidal pulse width modulation and complementary conduction having a phase difference of 180°.

The delay time $\delta_{t11}$, $\delta_{t12}$, $\delta_{t13}$ and $\delta_{t2}$ satisfy these conditions:

$$\delta_{t11} \geq \frac{E(2C_a + C_c)}{I_a};$$

$$\delta_{t12} \geq \frac{L_a}{E} i_{amax} + \frac{\pi}{2} \cdot \sqrt{2L_aC_a};$$

$$\delta_{t11} + \delta_{t12} + \delta_{t13} \leq t_{dead};$$

$$\delta_{t2} \geq \frac{E(2C_a + C_c)}{I_a} + \frac{L_a}{E} i_{amax} + \frac{\pi}{2} \cdot \sqrt{2L_aC_a} + \pi \cdot \sqrt{\frac{L_bC_bC_c}{C_b + C_c}} - \delta_{t11} - \delta_{t12} - \delta_{t13},$$

where E is the input DC power voltage value; $C_a$ is the capacitance value of the first main resonant capacitor or the second main resonant capacitor; $C_b$ is the capacitance value of the first auxiliary resonant capacitor or the second auxiliary resonant capacitor; $C_c$ is the capacitance value of the third auxiliary resonant capacitor or the fourth auxiliary resonant capacitor; $L_a$ is the inductance value of the first auxiliary resonant inductor or the second auxiliary resonant inductor; $L_b$ is the inductance value of the third auxiliary resonant inductor or the fourth auxiliary resonant inductor; $t_{dead}$ is the switching dead time of the switching tubes of an upper and a lower bridge arms of a hard-switching inverter; $I_a$ is a set separated current value; and $i_{amax}$ is an output maximum load current value.

The modulation methods of B-phase and C-phase main inverter circuits and the double auxiliary resonant commutator circuits thereof are the same as those of A-phase main inverter circuit.

Twelve operating modes of the A-phase circuit of the double auxiliary resonant commutated pole three-phase soft-switching inverter circuit of the embodiment within one switching cycle are shown in FIG. 6. To simplify the analysis, it is assumed that: ① all the devices are ideal devices; ② the load inductance is much greater than resonant inductance, and the load current at the transition instant of the switching states of the inverter can be considered as a constant current source $i_a$; ③ the initial voltage value of the first auxiliary resonant capacitor $C_{a1}$ in each switching cycle is $V_{x1}$; because the minimum voltage value of the first auxiliary resonant capacitor $C_{a1}$ is 0 and the maximum value is input DC power voltage E, the variation range of the initial voltage value $V_{x1}$ of the first auxiliary resonant capacitor $C_{a1}$ in one power frequency cycle is from 0 to E.

Figure 6A:
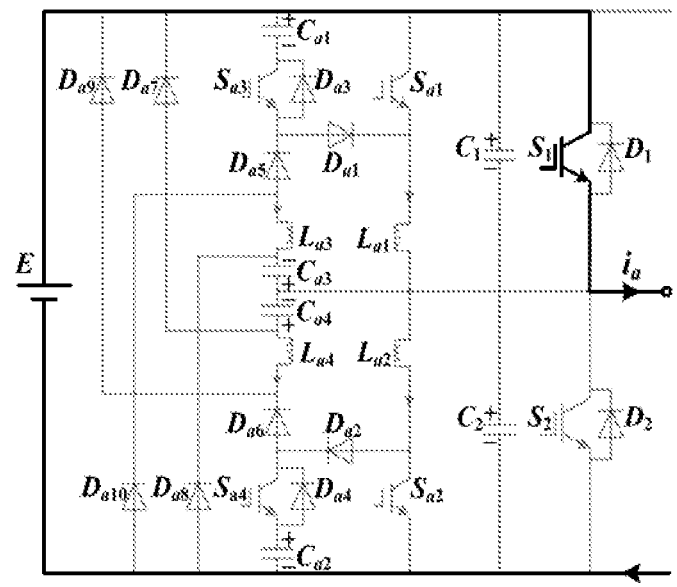

The operating mode of the A-phase main inverter circuit and the A-phase double auxiliary resonant commutator circuit in the double auxiliary resonant commutated pole three-phase soft-switching inverter circuit includes:

Mode a [up to $t_0$]: As shown in FIG. 6a, the first main switching tube $S_1$ and the third auxiliary switching tube $S_{a3}$ are conducted; the second main switching tube $S_2$, the first auxiliary switching tube $S_{a1}$, the second auxiliary switching tube $S_{a2}$ and the fourth auxiliary switching tube $S_{a4}$ are turned off; the current flows to the load through the first main switching tube $S_1$; and the circuit is in power supply state; at this moment, $v_{C1}=v_{Ca2}=v_{Ca4}=0$, $v_{C2}=v_{Ca3}=E$, $v_{Ca1}=V_{x1}$ ($V_{x1}$ is a constant ranging from 0 to E), $i_{La1}=i_{La2}=i_{La3}=i_{La4}=0$ and $i_{S1}=i_a$ ($i_a$ is a constant value).

Figure 6B:
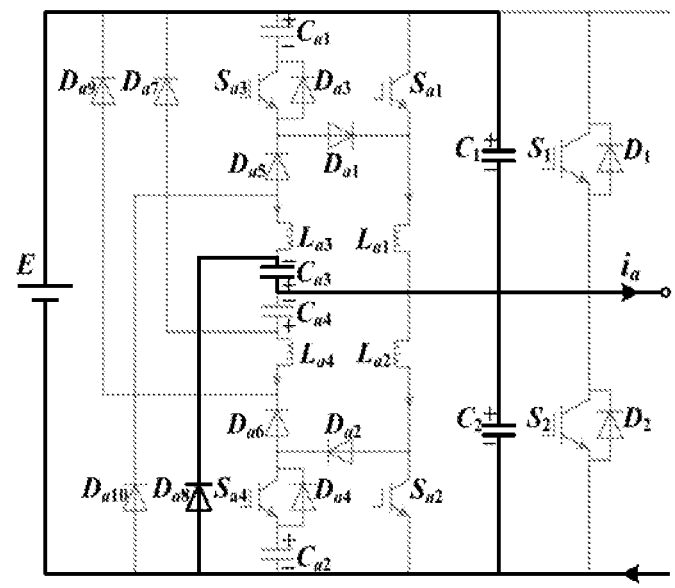

Mode b [$t_0$ to $t_1$]: As shown in FIG. 6b, at $t_0$ moment, the first main switching tube $S_1$ and the third auxiliary switching tube $S_{a3}$ are simultaneously turned off; the load current $i_a$ is commutated to the first main resonant capacitor $C_1$, the second main resonant capacitor $C_2$ and the third auxiliary resonant capacitor $C_{a3}$; the voltage of the second main resonant capacitor $C_2$ and the third auxiliary resonant capacitor $C_{a3}$ is linearly decreased from the input DC power voltage value E; the voltage of the first main resonant capacitor $C_1$ is linearly increased; the first main switching tube $S_1$ achieves zero-voltage turn-off; and meanwhile, the third auxiliary switching tube $S_{a3}$ achieves zero-voltage zero-current turn-off.

Figure 6C:
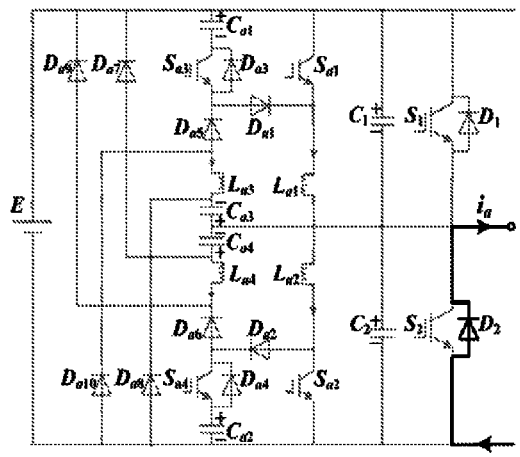

Mode c [$t_1$ to $t_2$]: As shown in FIG. 6c, at $t_1$ moment, when the voltage of the second main resonant capacitor $C_2$ and the third auxiliary resonant capacitor $C_{a3}$ is decreased to zero and the voltage of the first main resonant capacitor $C_1$ is increased to the input DC power voltage value E, the second main diode $D_2$ is conducted and the load current $i_a$ is commutated to the second main diode $D_2$; and when the second main switching tube $S_2$ is turned on during the conduction of the second main diode $D_2$, the second main switching tube $S_2$ achieves zero-voltage zero-current turn-on.

Figure 6D:
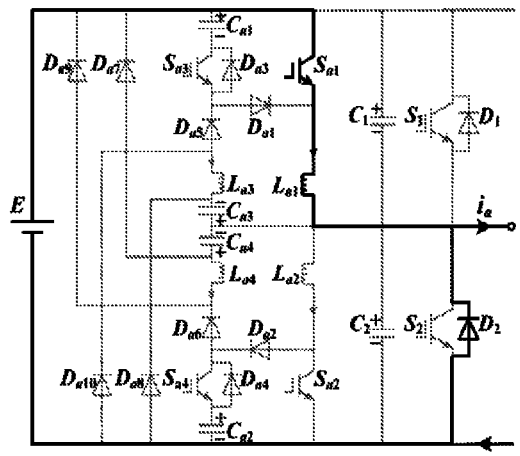

Mode d [$t_2$ to $t_3$]: As shown in FIG. 6d, at $t_2$ moment, after the turn-off time $\delta_{t11}$ of the second main switching tube $S_2$, the first auxiliary switching tube $S_{a1}$ is turned on; the current on the first auxiliary resonant inductor $L_{a1}$ rises from zero;

the current of the second main diode $D_2$ begins to decrease; the load current $i_a$ is commutated from the second main diode $D_2$ to the first auxiliary resonant inductor $L_{a1}$; and the first auxiliary switching tube $S_{a1}$ is turned on at zero current.

Figure 6E:
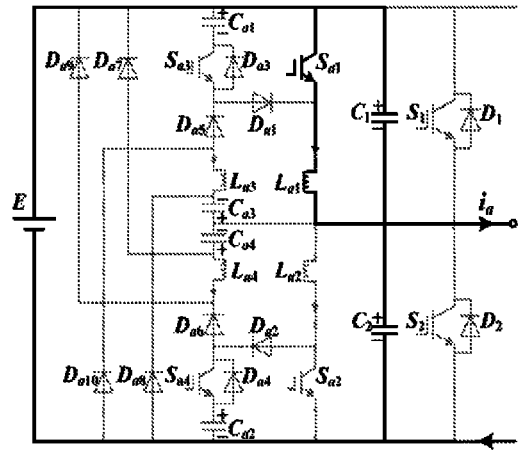

Mode e [$t_3$ to $t_4$]: As shown in FIG. 6e, at $t_3$ moment, when the current of the first auxiliary resonant inductor $L_{a1}$ is increased to the load current value $i_a$, after the current of the second main diode $D_2$ is reduced to zero, the second main diode $D_2$ is turned off; the load current $i_a$ is completely commutated to the first auxiliary resonant inductor $L_{a1}$; the first main resonant capacitor $C_1$, the second main resonant capacitor $C_2$ and the first auxiliary resonant inductor $L_{a1}$ begin resonance; the voltage of the first main resonant capacitor $C_1$ begins to decrease from the power voltage value E; the voltage of the second main resonant capacitor $C_2$ begins to rise from zero; and the current that flows through the first auxiliary resonant inductor $L_{a1}$ is the sum of the resonant current and the load current at the moment of current commutation.

Figure 6F:
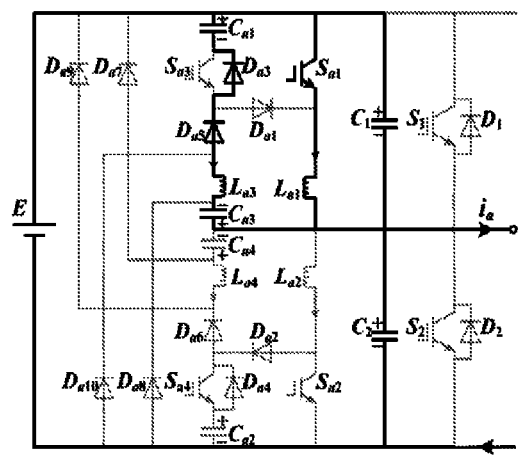

Mode f [$t_4$ to $t_5$]: As shown in FIG. 6f, at $t_4$ moment, when the voltage of the first main resonant capacitor $C_1$ is decreased to the initial voltage value of the first auxiliary resonant capacitor $C_{a1}$, the third auxiliary diode $D_{a3}$ and the fifth auxiliary diode $D_{a5}$ are conducted; the first auxiliary resonant capacitor $C_{a1}$, the third auxiliary resonant capacitor $C_{a3}$, the third auxiliary resonant inductor $L_{a3}$ and the first auxiliary resonant inductor $L_{a1}$ begin resonance; the first auxiliary resonant capacitor $C_{a1}$ is discharged; the third auxiliary resonant capacitor $C_{a3}$ is charged; the first main resonant capacitor $C_1$, the second main resonant capacitor $C_2$ and the first auxiliary resonant inductor $L_{a1}$ continue to carry out resonance; the voltage of the first main resonant capacitor $C_1$ is decreased; the voltage of the second main resonant capacitor $C_2$ is increased; when the third auxiliary switching tube $S_{a3}$ is turned on within an interval from this mode to the turn-off of the first auxiliary switching tube $S_{a1}$, the third auxiliary switching tube $S_{a3}$ achieves zero-voltage turn-on; when the voltage of the first main resonant capacitor $C_1$ is decreased to zero, the first main resonant capacitor $C_1$, the second main resonant capacitor $C_2$ and the first auxiliary resonant inductor $L_{a1}$ finish resonance.

Figure 6G:
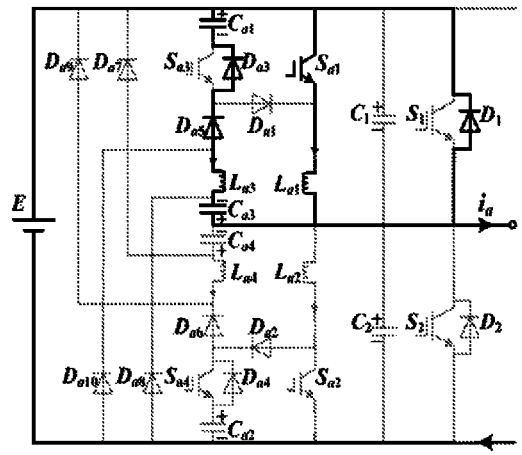

Mode g [$t_5$ to $t_6$]: As shown in FIG. 6g, at $t_5$ moment, when the current of the first auxiliary resonant inductor $L_{a1}$ reaches a maximum value $i_{La1max}$, the first main diode $D_1$ is conducted; the first auxiliary resonant capacitor $C_{a1}$, the third auxiliary resonant inductor $L_{a3}$ and the third auxiliary resonant capacitor $C_{a3}$ continue to carry out resonance; the first auxiliary resonant capacitor $C_{a1}$ continues to be discharged; the third auxiliary resonant capacitor $C_{a3}$ continues to be charged; the energy in the first auxiliary resonant capacitor $C_{a1}$ continues to transfer to the third auxiliary resonant capacitor $C_{a3}$; the current in the first auxiliary resonant inductor $L_{a1}$ keeps the maximum current value $i_{La1max}$ unchanged; when the first main switching tube $S_1$ is turned on during the conduction of the first main diode $D_1$, the first main switching tube $S_1$ achieves zero-voltage turn-on; and when the current of the third auxiliary resonant inductor $L_{a3}$ is decreased to zero, the first auxiliary resonant capacitor $C_{a1}$, the third auxiliary resonant inductor $L_{a3}$ and the third auxiliary resonant capacitor $C_{a3}$ finish resonance.

Figure 6H:
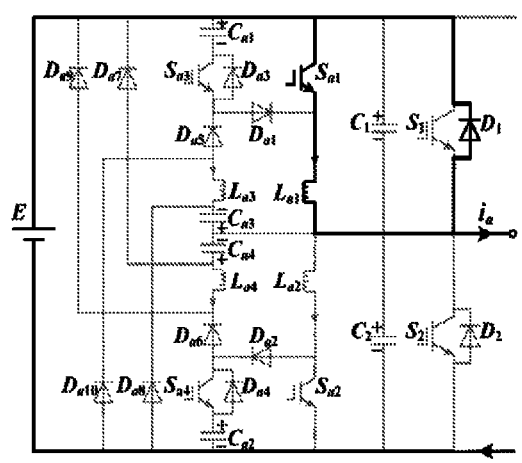

Mode h [$t_6$ to $t_7$]: As shown in FIG. 6h, at $t_6$ moment, when the current of the third auxiliary resonant inductor $L_{a3}$ is decreased to zero, the energy in the first auxiliary resonant capacitor $C_{a1}$ is completely transferred to the third auxiliary resonant capacitor $C_{a3}$; the voltage across the first auxiliary resonant capacitor $C_{a3}$ is decreased to zero; the third auxiliary diode $D_{a3}$ and the fifth auxiliary diode $D_{a5}$ are turned off; and the resonant current is circulated in a loop formed by the first auxiliary switching tube $S_{a1}$, the first auxiliary resonant inductor $L_{a1}$ and the first main diode $D_1$.

Figure 6I:
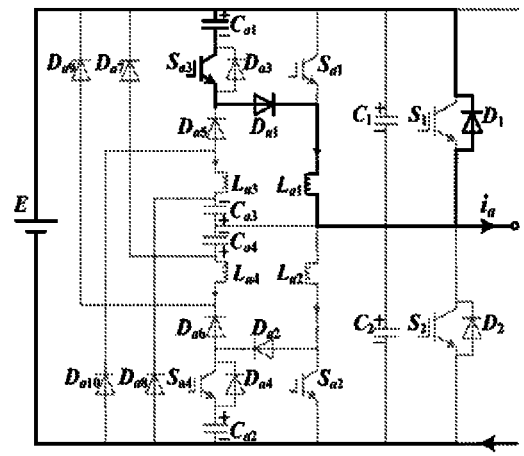

Mode i [$t_7$ to $t_8$]: As shown in FIG. 6i, at $t_7$ moment, after the first auxiliary switching tube $S_{a1}$ is turned off, the first auxiliary diode $D_{a1}$ is conducted; the first auxiliary resonant inductor $L_{a1}$ and the first auxiliary resonant capacitor $C_{a1}$ begin resonance; the energy in the first auxiliary resonant inductor $L_{a1}$ transfers to the first auxiliary resonant capacitor $C_{a1}$; the voltage of the first auxiliary resonant capacitor $C_{a1}$ is increased from zero; and the first auxiliary switching tube $S_{a1}$ achieves zero-voltage turn-off.

Figure 6J:
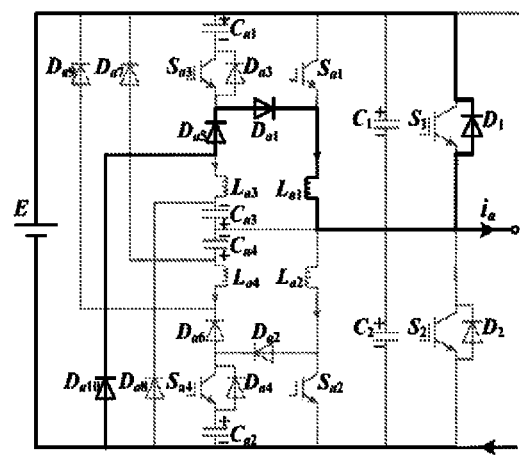

Mode j [$t_8$ to $t_9$]: As shown in FIG. 6j, at $t_8$ moment, when the voltage of the first auxiliary resonant capacitor $C_{a1}$ is increased to the input DC power voltage value E, the fifth auxiliary diode $D_{a5}$ and the tenth auxiliary diode $D_{a10}$ are conducted; the energy of the first auxiliary resonant inductor $L_{a1}$ is fed back to the input DC power supply through the first auxiliary diode $D_{a1}$, the fifth auxiliary diode $D_{a5}$ and the tenth auxiliary diode $D_{a10}$; and the current in the first auxiliary resonant inductor $L_{a1}$ is linearly decreased.

Figure 6K:
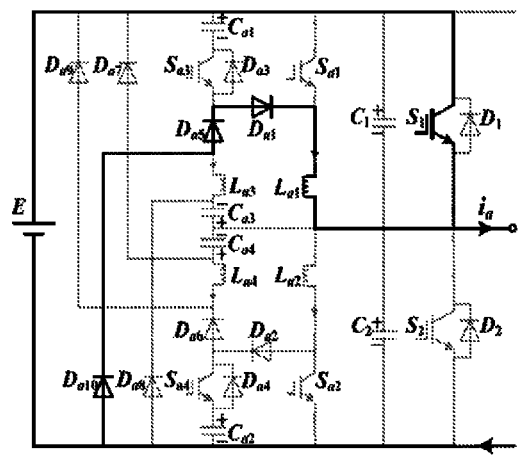

Mode k [$t_9$ to $t_{10}$]: As shown in FIG. 6k, at $t_9$ moment, when the current of the first auxiliary resonant inductor $L_{a1}$ is decreased to the load current value $i_a$, the first main diode $D_1$ is turned off; the first main switching tube $S_1$ is conducted; the load current is commutated from the first auxiliary resonant inductor $L_{a1}$ to the first main switching tube $S_1$; and the energy in the first auxiliary resonant inductor $L_{a1}$ is directly released to the load.

Figure 6L:
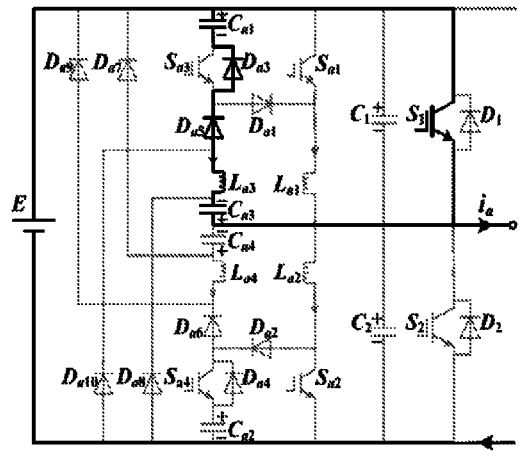

Mode l [$t_{10}$ to $t_{11}$]: As shown in FIG. 6l, at $t_{10}$ moment, when the current of the first auxiliary resonant inductor $L_{a1}$ is decreased to zero, the first auxiliary resonant capacitor $C_{a1}$, the third auxiliary resonant capacitor $C_{a3}$ and the third auxiliary resonant inductor $L_{a3}$ begin resonance; the first auxiliary resonant capacitor $C_{a1}$ begins to be discharged; the third auxiliary resonant capacitor $C_{a3}$ begins to be charged; the energy in the first auxiliary resonant capacitor $C_{a1}$ transfers to the third auxiliary resonant capacitor $C_{a3}$; and when the current of the third auxiliary resonant inductor $L_{a3}$ is decreased to zero, the energy transfer is ended and the circuit returns to Mode a again.

The operating mode of B-phase and C-phase main inverter circuits and the double auxiliary resonant commutator circuits in the double auxiliary resonant commutated pole three-phase soft-switching inverter circuit is the same as that of the A-phase main inverter circuit and the double auxiliary resonant commutator circuit.

Finally, three-phase alternating current obtained by inversion supplies power for an AC motor; and the amplitude and the frequency of the alternating current are adjusted according to the change of the torque and the rotational speed of the motor so that a variable-frequency speed adjusting system can be stably operated.

Figure 7:
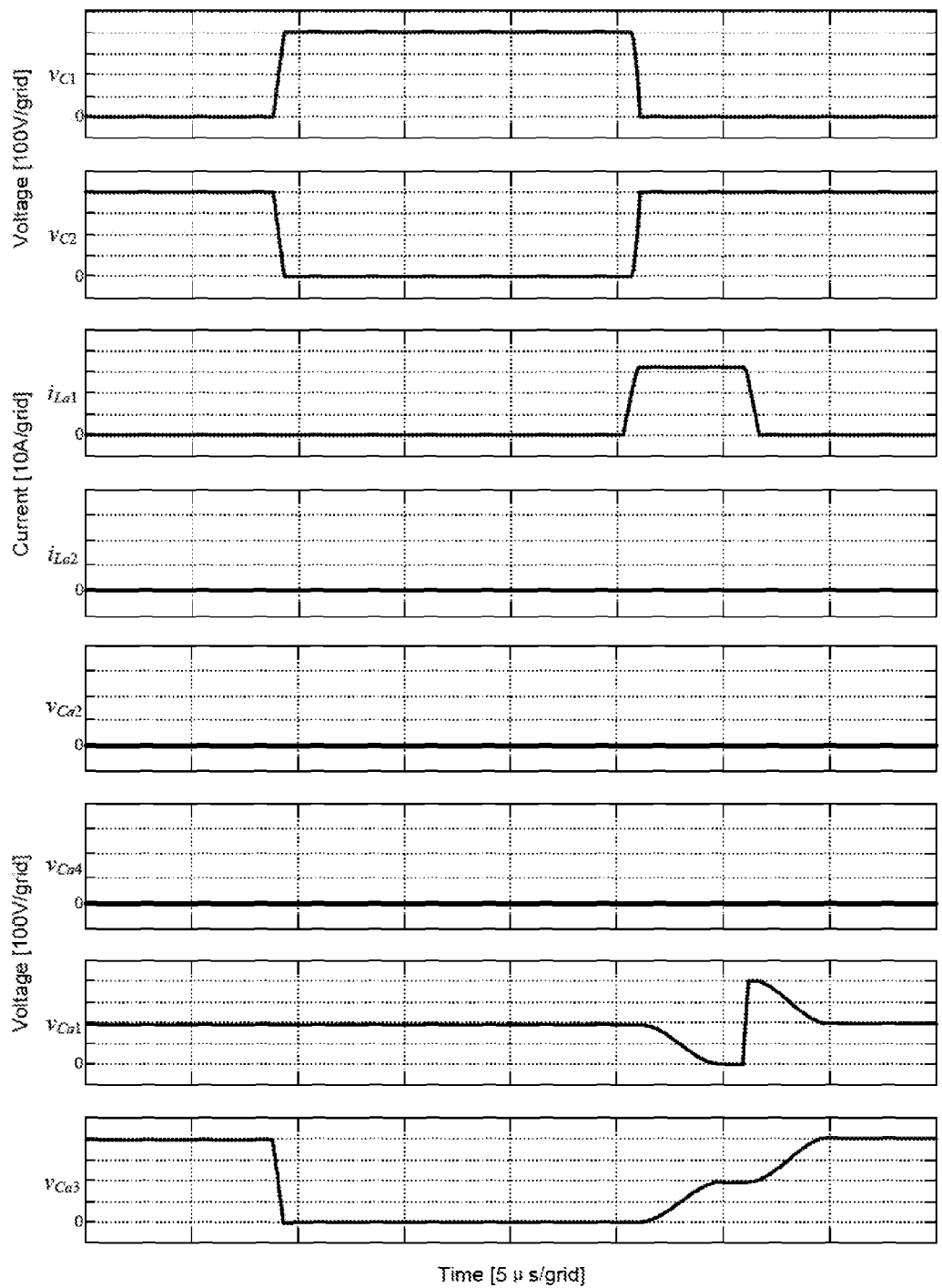
FIG. 7 shows simulation waveform diagrams of A-phase main elements of a double auxiliary resonant commutated pole three-phase soft-switching inverter circuit of an embodiment of the present invention.

The simulation waveform diagrams of A-phase main elements of the double auxiliary resonant commutated pole three-phase soft-switching inverter circuit of the embodiment is shown in FIG. 7. It can be seen that the voltage increasing rate of the first main resonant capacitor $C_1$, the second main resonant capacitor $C_2$, the first auxiliary resonant capacitor $C_{a1}$ and the third auxiliary resonant capacitor $C_{a3}$ is limited and the current increasing rate in the first auxiliary resonant inductor $L_{a1}$ is limited. Because of the presence of the auxiliary resonant inductors and the auxiliary resonant capacitors, after the switching devices are turned on, the current increasing rate thereof is limited and after the switching devices are turned off, the voltage increasing rate thereof is limited, thereby achieving soft-switching of the main and the auxiliary switching devices.

Figure 8:
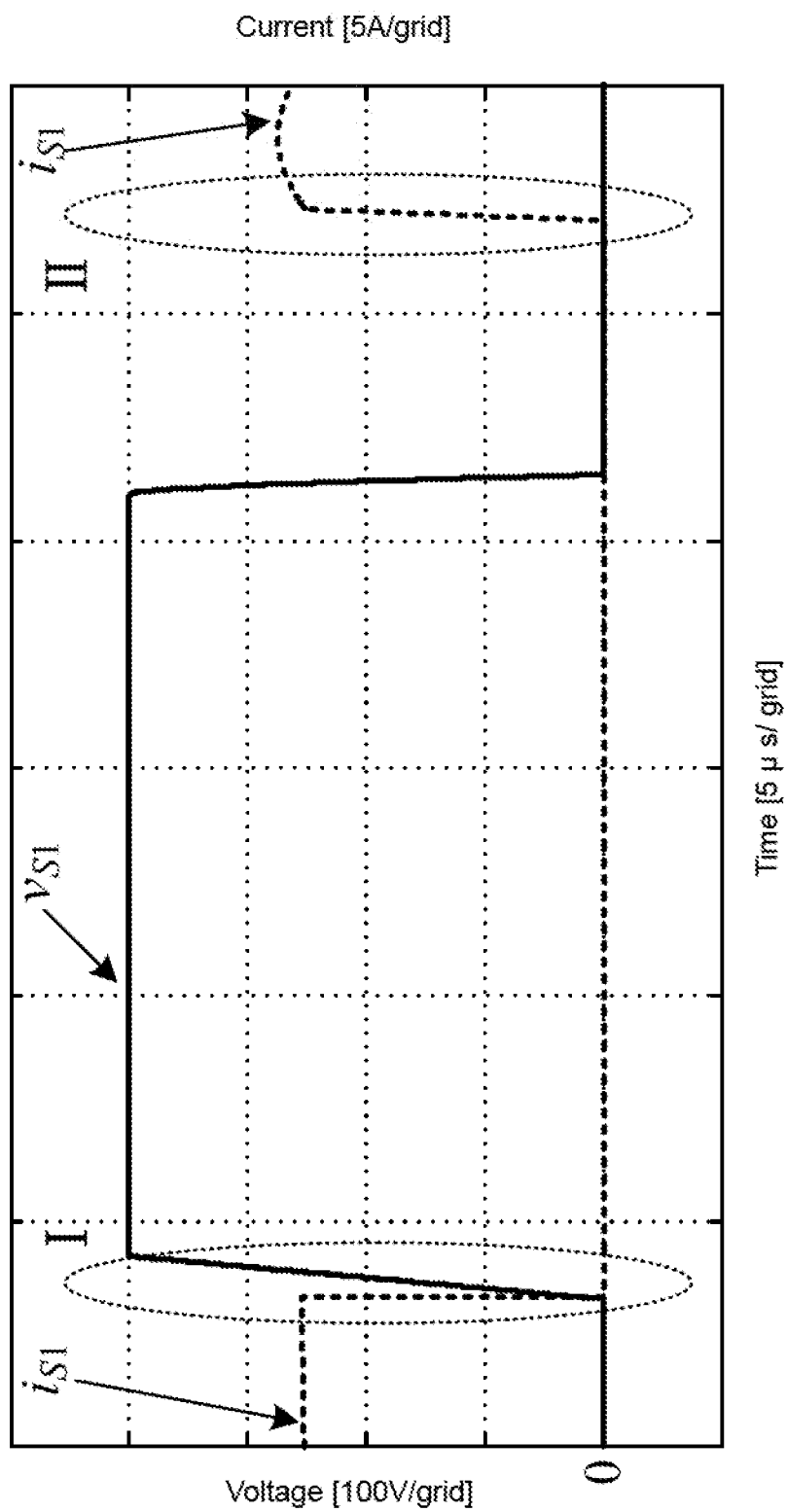
FIG. 8 is a simulation waveform diagram of voltage and current of a first main switching tube $S_1$ of A phase of a double auxiliary resonant commutated pole three-phase soft-switching inverter circuit of an embodiment of the present invention.

The simulation waveform of voltage $v_{S1}$ and current $i_{S1}$ of the first main switching tube $S_1$ of A phase of the double auxiliary resonant commutated pole three-phase soft-switching inverter circuit of the embodiment is shown in FIG. 8, wherein it can be seen from I zone that after the first main switching tube $S_1$ is turned off, the voltage $v_{S1}$ across the first main switching tube $S_1$ is gradually increased from 0. Therefore, the first main switching tube $S_1$ achieves ZVS (zero voltage switching) turn-off. It can be seen from II zone in FIG. 8 that after the first main switching tube $S_1$ is conducted, the current $i_{S1}$ that flows through the first main switching tube $S_1$ is gradually increased from 0, while the voltage $v_{S1}$ across the first main switching tube $S_1$ is always 0. Therefore, the first main switching tube $S_1$ achieves ZVZCS (zero-voltage zero-current switching) turn-on.

Figure 9:
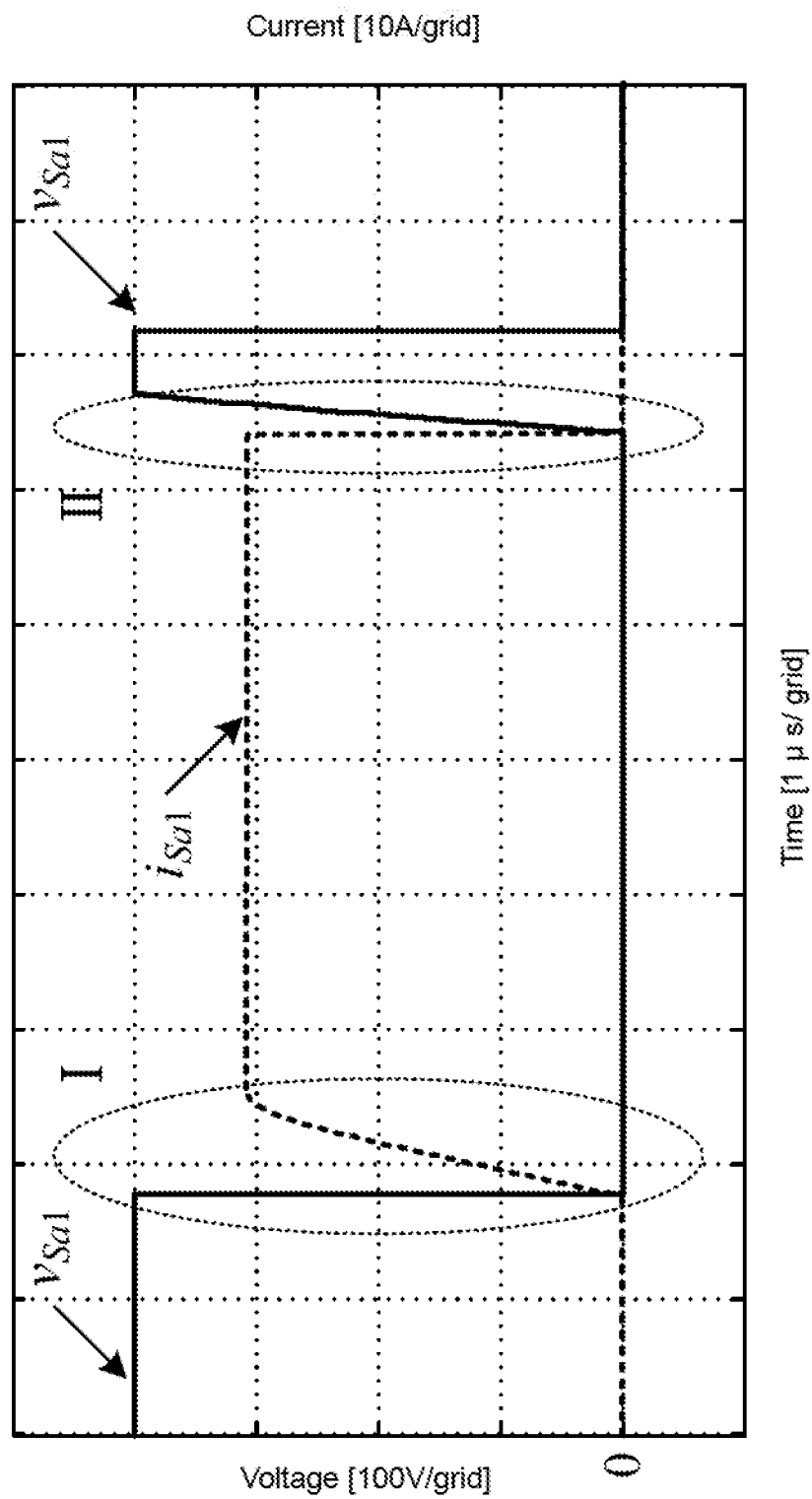
FIG. 9 is a simulation waveform diagram of voltage and current of a first auxiliary switching tube $S_{a1}$ of A phase of a double auxiliary resonant commutated pole three-phase soft-switching inverter circuit of an embodiment of the present invention.

The simulation waveform of voltage $v_{Sa1}$ and current $i_{Sa1}$ of a first auxiliary switching tube $S_{a1}$ of A phase of the double auxiliary resonant commutated pole three-phase soft-switching inverter circuit of the embodiment is shown in FIG. 9, wherein it can be seen from I zone that after the first auxiliary switching tube $S_{a1}$ is turned off, the current $i_{Sa1}$ that flows through the first auxiliary switching tube $S_{a1}$ is gradually increased from 0, so the first auxiliary switching tube $S_{a1}$ achieves ZCS (zero current switching) turn-on. It can be seen from II zone in FIG. 9 that after the first auxiliary switching tube $S_{a1}$ is turned off, the voltage $v_{Sa1}$ across the first auxiliary switching tube $S_{a1}$ is gradually increased from 0. Therefore, the first auxiliary switching tube $S_{a1}$ achieves ZVS (zero voltage switching) turn-off.

Figure 10:
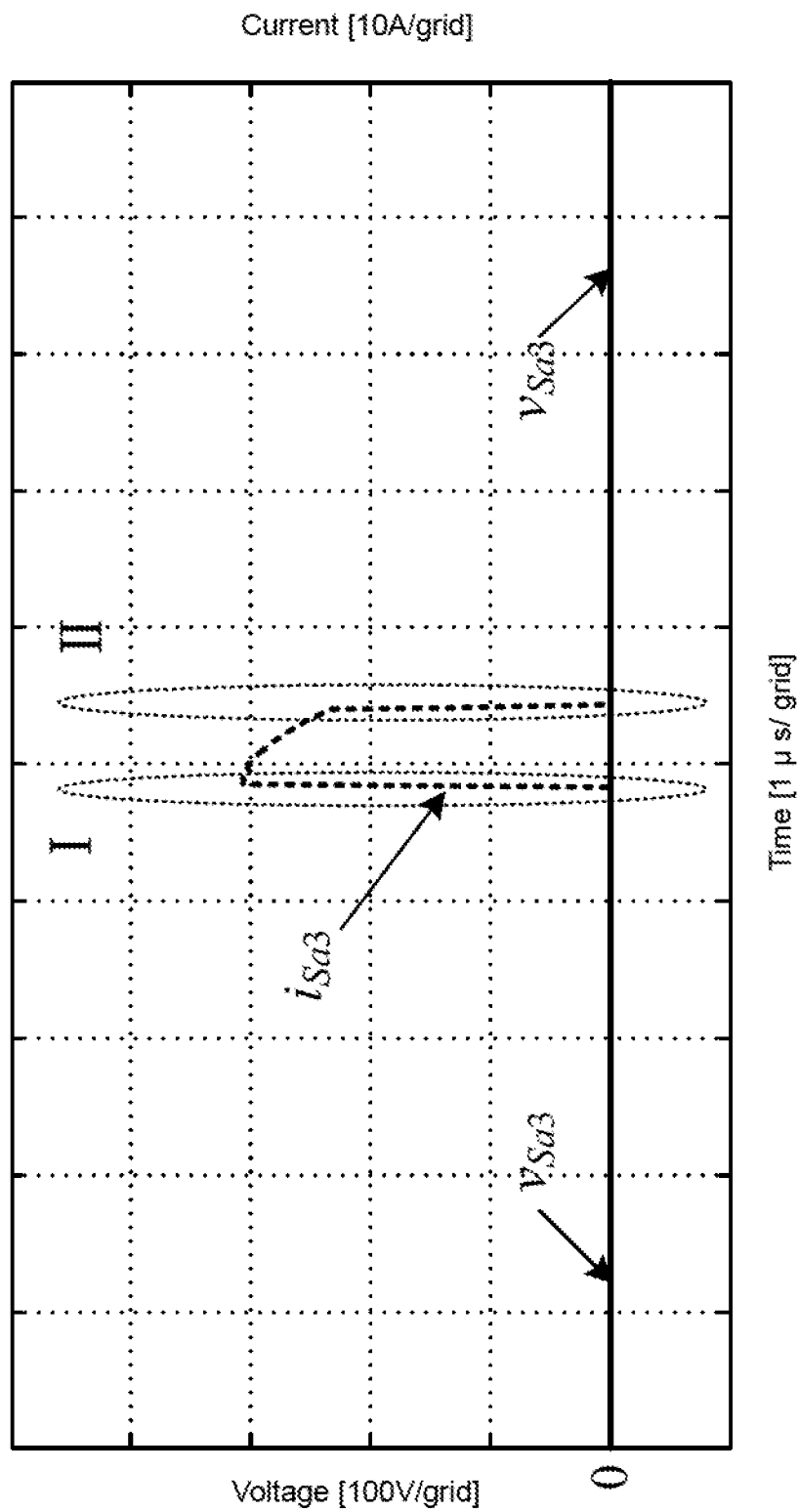
FIG. 10 is a simulation waveform diagram of voltage and current of a third auxiliary switching tube $S_{a3}$ of A phase of a double auxiliary resonant commutated pole three-phase soft-switching inverter circuit of an embodiment of the present invention.

The simulation waveform of voltage $v_{Sa3}$ and current $i_{Sa3}$ of the third auxiliary switching tube $S_{a3}$ of A phase of the double auxiliary resonant commutated pole three-phase soft-switching inverter circuit of the embodiment is shown in FIG. 10. It can be seen from I zone and II zone in the figure that in the processes of turning on and turning off the third auxiliary switching tube $S_{a3}$, the voltage $v_{Sa3}$ across the third auxiliary switching tube $S_{a3}$ is always 0, so the third auxiliary switching tube $S_{a3}$ achieves ZVZCS (zero-voltage zero-current switching).

The simulation waveform of current $i_{La1}$ of the first auxiliary resonant inductor $L_{a1}$ of A phase and current $i_{La2}$ of the second auxiliary resonant inductor $L_{a2}$ of A phase of the double auxiliary resonant commutated pole three-phase soft-switching inverter circuit of the embodiment is shown in FIG. 11b. FIG. 11a is the simulation waveform of current of the auxiliary resonant inductor of the double auxiliary resonant commutated pole three-phase soft-switching inverter. It can be seen that within most of time of the whole power frequency cycle of the double auxiliary resonant commutated pole three-phase soft-switching inverter circuit of the embodiment, only one of the first auxiliary resonant inductor $L_{a1}$ or the second auxiliary resonant inductor $L_{a2}$ participates in current commutation. However, in the whole power frequency cycle of the double auxiliary resonant commutated pole three-phase soft-switching inverter, both of the first auxiliary resonant inductor and the second auxiliary resonant inductor need to participate in resonance.

It can be seen through contrast of both that within most of time of the whole power frequency cycle of the double auxiliary resonant commutated pole three-phase soft-switching inverter circuit of the embodiment, only one auxiliary resonant inductor participates in current commutation, obviously helping to reduce the conduction loss of the double auxiliary resonant commutator circuit. In addition, it can be seen from the figure that the current in the first auxiliary resonant inductor and the second auxiliary resonant inductor of the double auxiliary resonant commutated pole three-phase soft-switching inverter circuit of the embodiment is apparently less than the current in the first auxiliary resonant inductor and the second auxiliary resonant inductor of the double auxiliary resonant commutated pole three-phase soft-switching inverter. Therefore, the current stress of the auxiliary switching tubes of the double auxiliary resonant commutated pole three-phase soft-switching inverter circuit of the embodiment is effectively reduced.

Figures 12A, 12B:
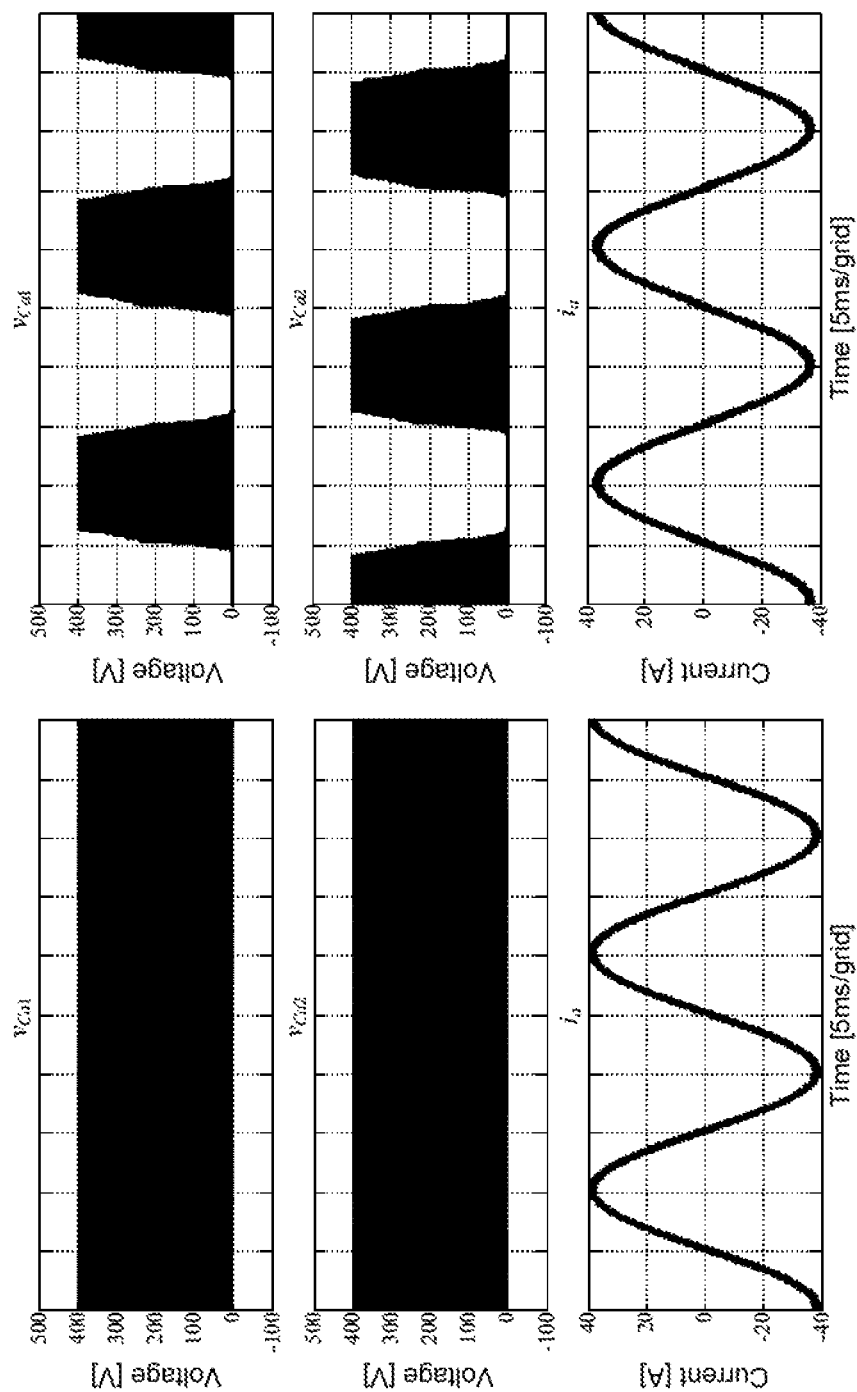

The simulation waveform diagram of voltage $v_{Ca1}$ of the first auxiliary resonant capacitor $C_{a1}$ of A phase and voltage $v_{Ca2}$ of the second auxiliary resonant capacitor $C_{a2}$ of A phase of the double auxiliary resonant commutated pole three-phase soft-switching inverter circuit of the embodiment is shown in FIG. 12b. FIG. 12a is the simulation waveform of voltage of the auxiliary resonant capacitor of the double auxiliary resonant commutated pole three-phase soft-switching inverter. It can be seen that within most of time of the whole power frequency cycle of the double auxiliary resonant commutated pole three-phase soft-switching inverter circuit of the embodiment, only one of the first auxiliary resonant capacitor or the second auxiliary resonant capacitor participates in current commutation. However, in the whole power frequency cycle of the double auxiliary resonant commutated pole three-phase soft-switching inverter, both of the first auxiliary resonant capacitor and the second auxiliary resonant capacitor need to participate in resonance.

It can be seen through contrast of both that within most of time of the whole power frequency cycle of the double auxiliary resonant commutated pole three-phase soft-switching inverter circuit of the embodiment, only one auxiliary resonant capacitor participates in current commutation. Therefore, the double auxiliary resonant commutated pole three-phase soft-switching inverter circuit of the embodiment can effectively reduce the conduction loss of the double auxiliary resonant commutator circuit.

What is claimed is:

1. A double auxiliary resonant commutated pole three-phase soft-switching inverter circuit, comprising a three-phase main inverter circuit and a three-phase double auxiliary resonant commutator circuit;
   the three-phase main inverter circuit adopts a three-phase bridge type circuit structure that comprises an A-phase main inverter circuit, a B-phase main inverter circuit and a C-phase main inverter circuit; the three-phase double auxiliary resonant commutator circuit comprises an A-phase double auxiliary resonant commutator circuit, a B-phase double auxiliary resonant commutator circuit and a C-phase double auxiliary resonant commutator circuit;
   the A-phase double auxiliary resonant commutator circuit, the A-phase main inverter circuit, the B-phase double auxiliary resonant commutator circuit, the B-phase main inverter circuit, the C-phase double auxiliary resonant commutator circuit and the C-phase main inverter circuit are connected in parallel in sequence and simultaneously connected with a DC power supply in parallel;
   the main inverter circuit of each phase comprises a first main switching tube, a second main switching tube, a first main diode and a second main diode; an emitter of the first main switching tube is connected with a collector of the second main switching tube, the first main switching tube and the first main diode are connected in inverse parallel, and the second main switching tube and the second main diode are connected in inverse parallel;

the double auxiliary resonant commutator circuit of each phase comprises a first auxiliary switching tube, a second auxiliary switching tube, a third auxiliary switching tube, a fourth auxiliary switching tube, a first main resonant capacitor, a second main resonant capacitor, a first auxiliary resonant capacitor, a second auxiliary resonant capacitor, a third auxiliary resonant capacitor, a fourth auxiliary resonant capacitor, a first auxiliary resonant inductor, a second auxiliary resonant inductor, a third auxiliary resonant inductor, a fourth auxiliary resonant inductor, a first auxiliary diode, a second auxiliary diode, a third auxiliary diode, a fourth auxiliary diode, a fifth auxiliary diode, a sixth auxiliary diode, a seventh auxiliary diode, an eighth auxiliary diode, a ninth auxiliary diode and a tenth auxiliary diode;

a negative electrode of the first main resonant capacitor is connected with a positive electrode of the second main resonant capacitor; a positive electrode of the first main resonant capacitor is connected with a collector of the first auxiliary switching tube; a negative electrode of the second main resonant capacitor is connected with an emitter of the second auxiliary switching tube; an emitter of the first auxiliary switching tube is connected with one end of the first auxiliary resonant inductor; the other end of the first auxiliary resonant inductor is connected to a connection point between the first main resonant capacitor and the second main resonant capacitor; a collector of the second auxiliary switching tube is connected with one end of the second auxiliary resonant inductor; and the other end of the second auxiliary resonant inductor is connected to a connection point between the first main resonant capacitor and the second main resonant capacitor;

a positive electrode of the first auxiliary resonant capacitor is connected with a collector of the first auxiliary switching tube; the positive electrode of the first auxiliary resonant capacitor is also connected to a positive electrode of a DC bus; a negative electrode of the first auxiliary resonant capacitor is connected with a collector of the third auxiliary switching tube; an emitter of the third auxiliary switching tube is connected with a cathode of the fifth auxiliary diode; an anode of the fifth auxiliary diode is connected with one end of the third auxiliary resonant inductor; the other end of the third auxiliary resonant inductor is connected with a negative electrode of the third auxiliary resonant capacitor; a positive electrode of the third auxiliary resonant capacitor is connected with a negative electrode of the fourth auxiliary resonant capacitor; the negative electrode of the fourth auxiliary resonant capacitor is also connected to a connection point between the first auxiliary resonant inductor and the second auxiliary resonant inductor; a positive electrode of the fourth auxiliary resonant capacitor is connected with one end of the fourth auxiliary resonant inductor; the other end of the fourth auxiliary resonant inductor is connected with a cathode of the sixth auxiliary diode; an anode of the sixth auxiliary diode is connected with a collector of the fourth auxiliary switching tube; an emitter of the fourth auxiliary switching tube is connected with a positive electrode of the second auxiliary resonant capacitor; a negative electrode of the second auxiliary resonant capacitor is connected with an emitter of the second auxiliary switching tube; and the negative electrode of the second auxiliary resonant capacitor is also connected to a negative electrode of the DC bus;

an anode of the first auxiliary diode is connected to a connection point between a cathode of the fifth auxiliary diode and an emitter of the third auxiliary switching tube, and a cathode of the first auxiliary diode is connected to a connection point between the emitter of the first auxiliary switching tube and the first auxiliary resonant inductor; a cathode of the second auxiliary diode is connected to a connection point between the anode of the sixth auxiliary anode and the collector of the fourth auxiliary switching tube, and an anode of the second auxiliary diode is connected to a connection point between the collector of the second auxiliary switching tube and the second auxiliary resonant inductor;

an anode of the third auxiliary diode is connected to a connection point between the cathode of the fifth auxiliary diode and the emitter of the third auxiliary switching tube, and a cathode of the third auxiliary diode is connected to a connection point between the negative electrode of the first auxiliary resonant capacitor and the collector of the third auxiliary switching tube; an anode of the fourth auxiliary diode is connected to a connection point between the positive electrode of the second auxiliary resonant capacitor and the emitter of the fourth auxiliary switching tube, and a cathode of the fourth auxiliary diode is connected to a connection point between the anode of the sixth auxiliary diode and the collector of the fourth auxiliary switching tube;

an anode of the seventh auxiliary diode is connected to a connection point between the fourth auxiliary resonant capacitor and the fourth auxiliary resonant inductor, and a cathode of the seventh auxiliary diode is connected to the positive electrode of the DC bus; a cathode of the eighth auxiliary diode is connected to a connection point between the third auxiliary resonant capacitor and the third auxiliary resonant inductor, and an anode of the eighth auxiliary diode is connected to the negative electrode of the DC bus;

an anode of the ninth auxiliary diode is connected to a connection point between the cathode of the sixth auxiliary diode and the fourth auxiliary resonant inductor, and a cathode of the ninth auxiliary diode is connected to the positive electrode of the DC bus; a cathode of the tenth auxiliary diode is connected to a connection point between the anode of the fifth auxiliary diode and the third auxiliary resonant inductor, and an anode of the tenth auxiliary diode is connected to the negative electrode of the DC bus; and the connection point between the third auxiliary resonant capacitor and the fourth auxiliary resonant capacitor, the connection point between the first auxiliary resonant inductor and the second auxiliary resonant inductor, the connection point between the first main resonant capacitor and the second main resonant capacitor, and the connection point between the first main switching tube and the second main switching tube are connected in sequence; and an outgoing line at the connection point between the first main switching tube and the second main switching tube is a single-phase AC output end.

2. The double auxiliary resonant commutated pole three-phase soft-switching inverter circuit of claim 1, wherein a collector of the first main switching tube of the three-phase main inverter circuit is connected with the collector of the first auxiliary switching tube, and an emitter of the second main switching tube is connected with the emitter of the second auxiliary switching tube.

3. The double auxiliary resonant commutated pole three-phase soft-switching inverter circuit of claim 1, wherein full-control switching devices are adopted by the first main switching tube and the second main switching tube of the three-phase main inverter circuit, and the first auxiliary switching tube, the second auxiliary switching tube, the third auxiliary switching tube and fourth auxiliary switching tube of the three-phase double auxiliary resonant commutator circuit.

4. The double auxiliary resonant commutated pole three-phase soft-switching inverter circuit of claim 3, wherein the full-control switching devices are power transistors, insulated gate bipolar transistors, power field effect transistors or intelligent power modules.

5. The double auxiliary resonant commutated pole three-phase soft-switching inverter circuit of claim 1, wherein fast recovery diodes or high-frequency diodes are adopted by the first main diode and the second main diode in the three-phase main inverter circuit and the first auxiliary diode, the second auxiliary diode, the third auxiliary diode, the fourth auxiliary diode, the fifth auxiliary diode, the sixth auxiliary diode, the seventh auxiliary diode, the eighth auxiliary diode, the ninth auxiliary diode and the tenth auxiliary diode in the three-phase double auxiliary resonant commutator circuit.

6. The double auxiliary resonant commutated pole three-phase soft-switching inverter circuit of claim 1, wherein the operating mode of the main inverter circuit of each phase and the double auxiliary resonant commutator circuit of each phase in the double auxiliary resonant commutated pole three-phase soft-switching inverter circuit comprises:

Mode a: The first main switching tube and the third auxiliary switching tube are conducted; the current flows to the load through the first main switching tube; and the circuit is in power supply state;

Mode b: The first main switching tube and the third auxiliary switching tube are simultaneously turned off; the load current is commutated to the first main resonant capacitor, the second main resonant capacitor and the third auxiliary resonant capacitor; under the action of the first main resonant capacitor, the second main resonant capacitor and the third auxiliary resonant capacitor, the first main switching tube achieves zero-voltage turn-off; and meanwhile, the third auxiliary switching tube achieves zero-voltage zero-current turn-off;

Mode c: When the voltage of the second main resonant capacitor and the third auxiliary resonant capacitor is decreased to zero and the voltage of the first main resonant capacitor is increased to an input DC power voltage value, the load current is commutated to the second main diode; and when the second main switching tube is turned on during the conduction of the second main diode, the second main switching tube achieves zero-voltage zero-current turn-on;

Mode d: The first auxiliary switching tube is turned on; the current on the first auxiliary resonant inductor rises from zero; the load current is commutated from the second main diode to the first auxiliary resonant inductor; and the first auxiliary switching tube is turned on at zero current;

Mode e: After the current of the second main diode is reduced to zero, the first main resonant capacitor, the second main resonant capacitor and the first auxiliary resonant inductor begin resonance; and the current that flows through the first auxiliary resonant inductor is the sum of the resonant current and the load current at the moment of current commutation;

Mode f: When the voltage of the first main resonant capacitor is decreased to the initial voltage value of the first auxiliary resonant capacitor, the first auxiliary resonant capacitor, the third auxiliary resonant capacitor, the third auxiliary resonant inductor and the first auxiliary resonant inductor begin resonance; the first main resonant capacitor, the second main resonant capacitor and the first auxiliary resonant inductor continue to carry out resonance; when the voltage of the first main resonant capacitor is decreased to zero, the first main resonant capacitor, the second main resonant capacitor and the first auxiliary resonant inductor finish resonance; and when the third auxiliary switching tube is turned on within an interval from this mode to the turn-off of the first auxiliary switching tube, the third auxiliary switching tube achieves zero-voltage turn-on;

Mode g: When the current of the first auxiliary resonant inductor reaches a maximum value, the first main diode is conducted; the first auxiliary resonant capacitor, the third auxiliary resonant inductor and the third auxiliary resonant capacitor continue to carry out resonance; the energy in the first auxiliary resonant capacitor continues to transfer to the third auxiliary resonant capacitor; the current in the first auxiliary resonant inductor keeps unchanged; when the current of the third auxiliary resonant inductor is decreased to zero, the first auxiliary resonant capacitor, the third auxiliary resonant inductor and the third auxiliary resonant capacitor finish resonance; and when the first main switching tube is turned on during the conduction of the first main diode, the first main switching tube achieves zero-voltage turn-on;

Mode h: When the current of the third auxiliary resonant inductor is decreased to zero, the third auxiliary diode and the fifth auxiliary diode are turned off; and the resonant current is circulated in a loop formed by the first auxiliary switching tube, the first auxiliary resonant inductor and the first main diode;

Mode i: After the first auxiliary switching tube is turned off, the first auxiliary resonant inductor and the first auxiliary resonant capacitor begin resonance; the energy in the first auxiliary resonant inductor transfers to the first auxiliary resonant capacitor; and the first auxiliary switching tube achieves zero-voltage turn-off;

Mode j: When the voltage of the first auxiliary resonant capacitor is increased to the input DC power voltage value, the energy of the first auxiliary resonant inductor is fed back to the input DC power supply through the first auxiliary diode, the fifth auxiliary diode and the tenth auxiliary diode;

Mode k: When the current of the first auxiliary resonant inductor is decreased to a load current value, the first main diode is turned off; the load current is commutated from the first auxiliary resonant inductor to the first main switching tube; and the energy in the first auxiliary resonant inductor is directly released to the load; and Mode l: When the current of the first auxiliary resonant inductor is decreased to zero, the first auxiliary resonant capacitor, the third auxiliary resonant capacitor and the third auxiliary resonant inductor begin resonance; the energy in the first auxiliary resonant capacitor transfers to the third auxiliary resonant capacitor; and when the current of the third auxiliary resonant inductor is decreased to zero, the energy transfer is ended and the circuit returns to Mode a again.

7. A modulation method of the double auxiliary resonant commutated pole three-phase soft-switching inverter circuit of claim 1, comprising the steps of:

simultaneously turning off the first main switching tube and the third auxiliary switching tube; making the turn-on moment of the second auxiliary switching tube later than the turn-off moment of the first main switching tube by $\delta_{t11}$ time; making the turn-on moment of the fourth auxiliary switching tube later than the turn-on moment of the second auxiliary switching tube by $\delta_{t12}$ time; making the turn-on moment of the second main switching tube later than the turn-on moment of the fourth auxiliary switching tube by $\delta_{t13}$ time; and making the turn-off moment of the second auxiliary switching tube later than the turn-on moment of the second main switching tube by $\delta_{t2}$ time;

simultaneously turning off the second main switching tube and the fourth auxiliary switching tube; making the turn-on moment of the first auxiliary switching tube later than the turn-off moment of the second main switching tube by $\delta_{t11}$ time; making the turn-on moment of the third auxiliary switching tube later than the turn-on moment of the first auxiliary switching tube by $\delta_{t12}$ time; making the turn-on moment of the first main switching tube later than the turn-on moment of the third auxiliary switching tube by $\delta_{t13}$ time; and making the turn-off moment of the first auxiliary switching tube later than the turn-on moment of the first main switching tube by $\delta_{t2}$ time; and operating each main switching tube in accordance with the mode of sinusoidal pulse width modulation and complementary conduction having a phase difference of 180°.

8. The modulation method of the double auxiliary resonant commutated pole three-phase soft-switching inverter circuit of claim 7, wherein the delay time $\delta_{t11}$, $\delta_{t12}$, $\delta_{t13}$ and $\delta_{t2}$ satisfy these conditions:

$$\delta_{t11} \geq \frac{E(2C_a + C_c)}{I_a};$$

$$\delta_{t12} \geq \frac{L_a}{E} i_{a\,max} + \frac{\pi}{2} \cdot \sqrt{2L_a C_a};$$

$$\delta_{t11} + \delta_{t12} + \delta_{t13} \leq t_{dead};$$

$$\delta_{t2} \geq \frac{E(2C_a + C_c)}{I_a} + \frac{L_a}{E} i_{a\,max} + \frac{\pi}{2} \cdot \sqrt{2L_a C_a} + \pi \cdot \sqrt{\frac{L_b C_b C_c}{C_b + C_c}} - \delta_{t11} - \delta_{t12} - \delta_{t13},$$

where E is the input DC power voltage value; $C_a$ is the capacitance value of the first main resonant capacitor or the second main resonant capacitor; $C_b$ is the capacitance value of the first auxiliary resonant capacitor or the second auxiliary resonant capacitor; $C_c$ is the capacitance value of the third auxiliary resonant capacitor or the fourth auxiliary resonant capacitor; $L_a$ is the inductance value of the first auxiliary resonant inductor or the second auxiliary resonant inductor; $L_b$ is the inductance value of the third auxiliary resonant inductor or the fourth auxiliary resonant inductor; $t_{dead}$ is the switching dead time of the switching tubes of an upper and a lower bridge arms of a hard-switching inverter; $I_a$ is a set separated current value; and $i_{amax}$ is an output maximum load current value.

* * * * *